(12) United States Patent
Ono

(10) Patent No.: US 9,721,353 B2
(45) Date of Patent: Aug. 1, 2017

(54) OPTICAL POSITIONAL INFORMATION DETECTION APPARATUS AND OBJECT ASSOCIATION METHOD

(71) Applicant: Yasuhiro Ono, Kanagawa (JP)

(72) Inventor: Yasuhiro Ono, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 64 days.

(21) Appl. No.: 14/950,128

(22) Filed: Nov. 24, 2015

(65) Prior Publication Data
US 2016/0162121 A1 Jun. 9, 2016

(30) Foreign Application Priority Data
Dec. 9, 2014 (JP) ................. 2014-248995

(51) Int. Cl.
| | |
|---|---|
| G06F 3/042 | (2006.01) |
| G06T 7/285 | (2017.01) |
| G06F 3/0354 | (2013.01) |
| G06T 7/593 | (2017.01) |

(52) U.S. Cl.
CPC .......... *G06T 7/285* (2017.01); *G06F 3/03545* (2013.01); *G06F 3/0421* (2013.01); *G06F 3/0428* (2013.01); *G06T 7/593* (2017.01); *G06F 2203/04104* (2013.01)

(58) Field of Classification Search
USPC ....................................................... 345/175
See application file for complete search history.

(56) References Cited

U.S. PATENT DOCUMENTS

| | | |
|---|---|---|
| 6,608,619 B2 | 8/2003 | Omura et al. |
| 2011/0193777 A1 | 8/2011 | Zhou et al. |
| 2012/0062591 A1 | 3/2012 | Omura et al. |
| 2015/0212728 A1 | 7/2015 | Omura et al. |
| 2015/0241997 A1 | 8/2015 | Ono |

FOREIGN PATENT DOCUMENTS

| | | |
|---|---|---|
| JP | 2008-176802 | 7/2008 |
| JP | 2011-522332 | 7/2011 |

OTHER PUBLICATIONS

U.S. Appl. No. 14/801,125, filed Jul. 16, 2015.

*Primary Examiner* — Gustavo Polo
(74) *Attorney, Agent, or Firm* — Cooper & Dunham LLP

(57) ABSTRACT

An optical positional information detection apparatus for detecting a position indicated by a pointer on a display surface. The optical positional information detection apparatus includes an imaging unit that captures an image of one or more pointers situated within a predetermined distance from the display surface; an image obtaining unit that obtains a first image captured by the imaging unit and a second image captured by the imaging unit; a movement distance calculation unit that uses a first feature amount based on the first image in which first pointers are captured and a second feature amount based on the second image in which second pointers are captured so that the movement distance calculation unit calculates a movement distance from the first pointers to the second pointers; and an association unit that associates the second pointers with the first pointers based on a limitation on the movement distance.

16 Claims, 17 Drawing Sheets

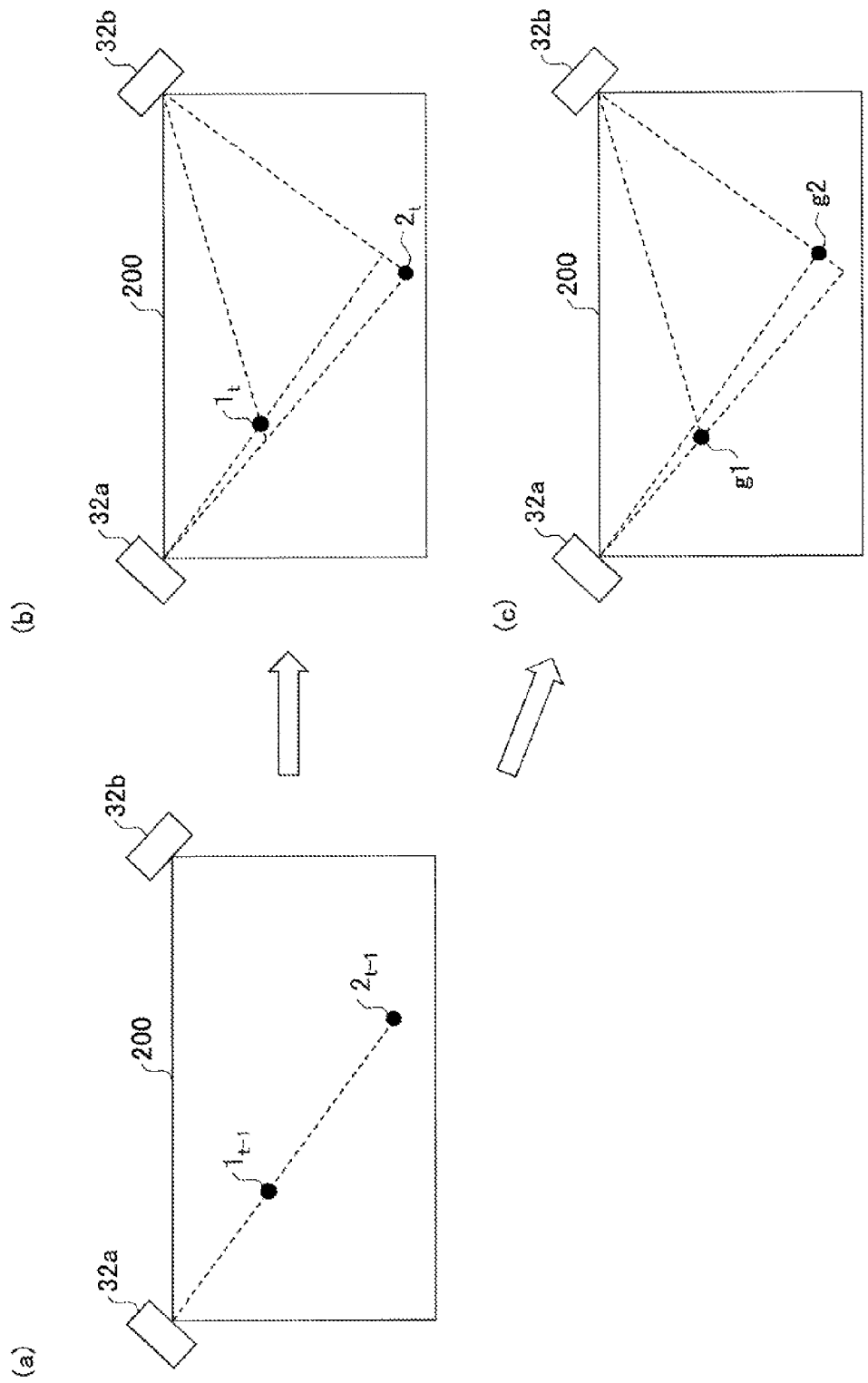

OPTICAL POSITIONAL INFORMATION DETECTION APPARATUS AND OBJECT ASSOCIATION METHOD

BACKGROUND OF THE INVENTION

Field of the Invention

The present invention relates to an optical positional information detection apparatus and an object association method.

Description of the Related Art

There are electronic white boards in which an information acquisition function, a display function, a communication function, and the like are added to a white board of related art. Information written on the electronic white board by a user is stored as coordinate data and the electronic white board renders the information on a display surface of a display. Accordingly, the user can draw characters or figures in the same manner as in a white board of related art. Further, the user can utilize drawing data by saving the drawing data or transmitting the drawing data to another electronic white board, for example.

One of methods by which the electronic white board obtains coordinates input by the user is an optical method. FIG. 1A schematically shows features of an optical coordinate detection method. Imaging units 32a and 32b are disposed at an upper left corner and an upper right corner of a display 200. The user uses an electronic pen that includes a light-emitting unit at a pen tip, the finger without the light-emitting unit, or a pen-shaped member (hereafter an "indication member") to draw characters or figures on the display 200. The electronic white board captures an image of the indication member using the two imaging units 32a and 32b and calculates coordinates of the indication member on a display surface of the display 200 based on triangulation. The indication member captured by the imaging units 32a and 32b is referred to as a target. In FIG. 1A, one target 1 is captured.

On a touch panel, it is possible to simultaneously detect a plurality of locations touched by the fingers or the like. With respect to the electronic white board, there is a demand for simultaneous use of indication members by a plurality of users or a demand for simultaneous use of a plurality of indication members by a single user.

However, when the plurality of indication members are to be used simultaneously, the electronic white board may detect a ghost point. The ghost point refers to detection or coordinates of the indication member at a location where there is no actual indication member. When the ghost point is detected, the electronic white board does not respond correctly (for example, a drawing point may be drawn at a location different from a location of writing with the indication member or an appropriate response may not be obtained when a plurality of fingers are used for operation).

The ghost point is described with reference to FIG. 1B. There are two targets 1 and 2 on the display surface of the display 200. In this case, a ghost point g1 appears on a point of intersection between a straight line connected to the imaging unit 32a and to the target 1 and a straight line connected to the imaging unit 32b and to the target 2. A ghost point g2 appears on a point of intersection between a straight line connected to the imaging unit 32a and to the target 2 and a straight line connected to the imaging unit 32b and to the target 1.

There have been suggestions of techniques that eliminate such a ghost point (see Patent Document 1, for example). Patent Document 1 discloses a method for preventing detection of ghost points by estimating a current location of a target whose past location and speed are input in a Kalman filter or the like.

However, in the method disclosed in Patent Document 1, if locations of two targets are close to each other when seen from one imaging unit, for example, a ghost point may be detected because it is difficult to track the targets while identifying the targets.

[Patent Document 1] Japanese Translation Publication No. 2011-522332 of PCT International Application

SUMMARY OF THE INVENTION

It is a general object of at least one embodiment of the present invention to provide an optical positional information detection apparatus that is capable of preventing detection of ghost points.

In an embodiment, an optical positional information detection apparatus for detecting a position indicated by a pointer on a display surface where information is displayed is provided. The optical positional information detection apparatus includes: an imaging unit that captures an image of one or more pointers situated within a predetermined distance from the display surface; an image obtaining unit that obtains a first image captured by the imaging unit at a first time and a second image captured by the imaging unit at a second time that follows the first time; a movement distance calculation unit that uses a first feature amount based on the first image in which one or more first pointers are captured and a second feature amount based on the second image in which one or more second pointers are captured so that the movement distance calculation unit calculates a movement distance from each of the one or more first pointers captured in the first image to each of the one or more second pointers captured in the second image; and an association unit that associates each of the one or more second pointers captured in the second image with a corresponding one of the one or more first pointers captured in the first image based on a limitation on the movement distance.

The present invention can provide an optical positional information detection apparatus that is capable of preventing detection of ghost points.

BRIEF DESCRIPTION OF THE DRAWINGS

Other objects and further features of embodiments will become apparent from the following detailed description when read in conjunction with the accompanying drawings, in which:

FIG. 2 is a diagram showing arrangement of targets when two targets are present and one imaging unit captures an image of only one target;

DESCRIPTION OF THE PREFERRED EMBODIMENTS

Figure 1A:
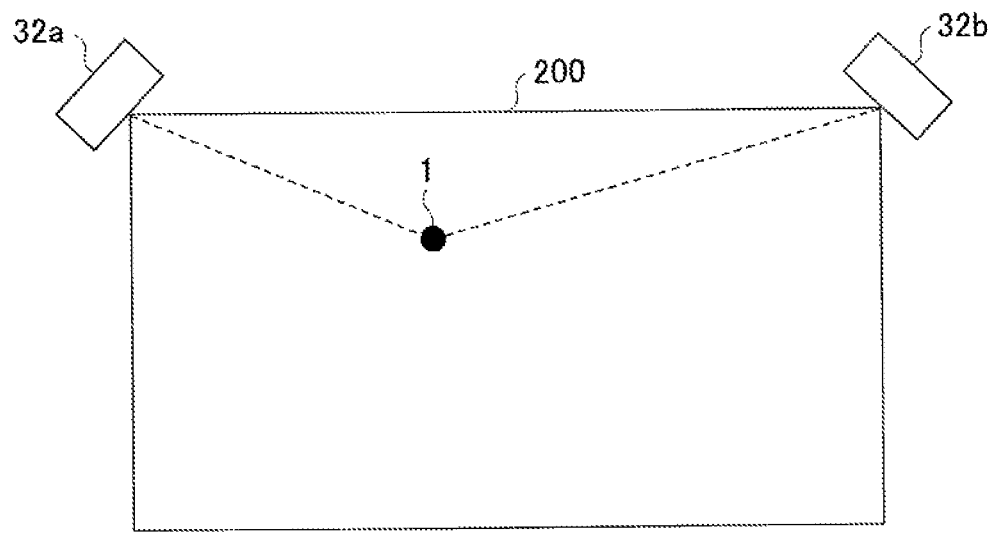
FIG. 1A is a schematic diagram showing a configuration of an optical coordinates detection method.
Figure 1B:
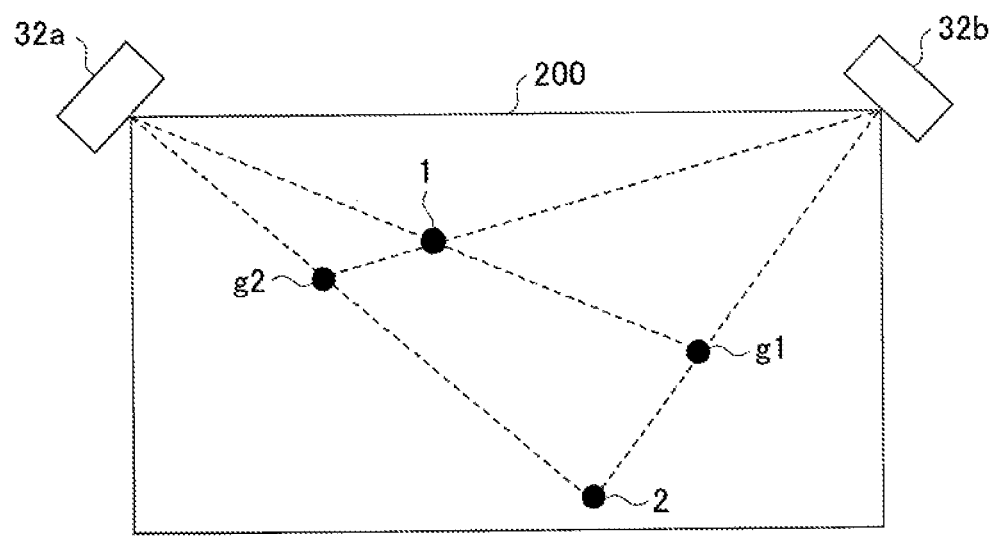
FIG. 1B is a schematic diagram showing a configuration of an optical coordinates detection method.

In the following, embodiments of the present invention will be described with reference to the accompanying drawings.

TERMS

Terms used for the present embodiment are described.

Indication member: a member that can indicate a display surface of the display 200 such as an electronic pen that includes a light-emitting unit, the finger without the light-emitting unit, or a pen-shaped member is referred to as an indication member. The indication member is an example of a pointer.

Target: an indication member captured by an imaging unit is referred to as a target.

Blob: an image of a target captured by an imaging unit. The blob includes an image captured as noise without an actual target. In addition, the noise refers to an image that shows an object other than a target.

Coordinates: positional information that indicates a location of an indication member on the display surface of the display 200 of an electronic white board. The coordinates are represented in world coordinates that indicate one point in a three-dimensional coordinate system where an origin is predetermined. Or the coordinates may be represented using a two-dimensional coordinate system where an origin is at a corner (upper left corner, for example) of the display 200.

<Situation where a Ghost Point is Likely to be Detected>

In order to describe an electronic white board according to the present embodiment, a situation where a ghost point is likely to be detected in related art (Patent Document 1) is described. The electronic white board according to the present embodiment can prevent detection of ghost points regardless of a situation where ghost points are likely to be detected in related art.

A situation where ghost points are likely to be detected in related art is created in a case where locations of two targets captured by one imaging unit 32 are relatively close to each other, more specifically, a case where an angle formed by a straight line connected to a first target and to the imaging unit 32 and a straight line connected to a second target and to the imaging unit 32 is relatively small. These cases are referred to as "a case where an incidence angle from a target is relatively small." In the following, the cases are classified into two cases for description below.

1. If two targets are present and one imaging unit 32 detects one target

FIG. 2 is a diagram showing arrangement of targets if two targets are present and one imaging unit 32 captures an image of only one target. In addition, t and t−1 given to reference numerals of the targets indicate an imaging time.

Time t−1: as shown in FIG. 2-(a), because two targets 1 and 2 are present on a straight line connected to the imaging unit 32a and to an electronic pen, the imaging unit 32a captures an image of only one target 1.

Time t: as shown in FIG. 2-(b), the target 1 has moved slightly in an x direction and the target 2 has stayed still in the same location as at the time t−1. Locations of the targets 1 and 2 shown in FIG. 2-(b) indicate actual locations of the targets 1 and 2.

However, the technique disclosed in Cited Document 1 estimates a current location of the target 1 using a past location and a speed of the target 1. Accordingly, the target 2 captured by the imaging unit 32a at the time t may be mistaken for the target 1. In other words, it is impossible to track the target 1 as the target 1 or to track the target 2 as the target 2. In this case, the electronic white board detects a ghost point g1 and a ghost point g2 at locations shown in FIG. 2-(c).

2. If two targets 1 and 2 are present and imaging unit 32a detects targets 1 and 2

Figure 3:
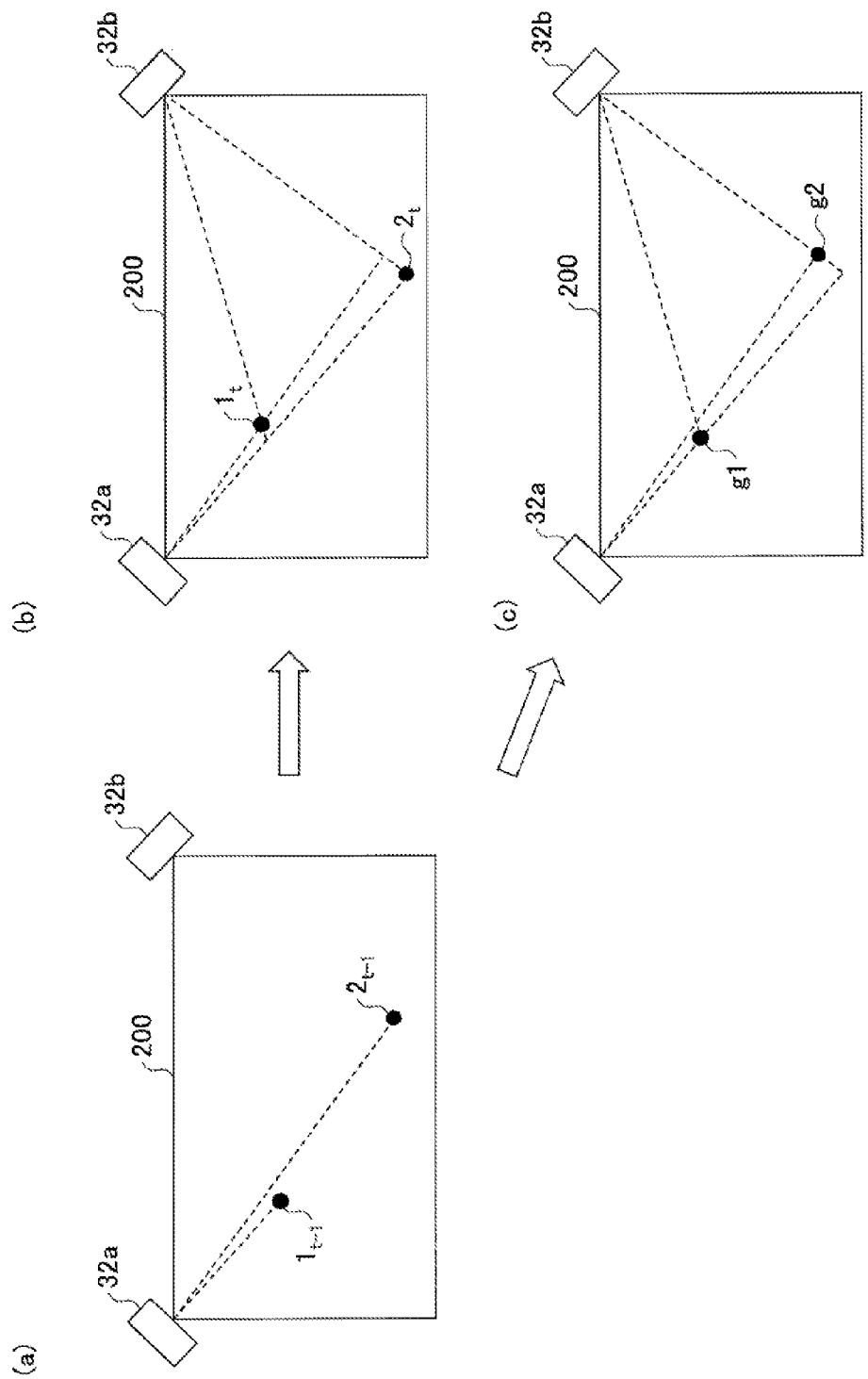
FIG. 3 is a diagram showing arrangement of targets 1 and 2 captured by an imaging unit.

FIG. 3 is a diagram showing arrangement of targets 1 and 2 captured by the imaging unit 32a.

Time t−1: as shown in FIG. 3-(a), two targets 1 and 2 are captured by the imaging unit 32a with a relatively small incidence angle. The imaging unit 32a detects two targets 1 and 2.

Time t: as shown in FIG. 3-(b), the target 1 has moved onto a straight line connected to the imaging unit 32a and to the target 2 at the time t−1 and the target 2 has moved onto a straight line connected to the imaging unit 32a and to the target 1 at the time t−1. Locations of the targets 1 and 2 shown in FIG. 3-(b) indicate actual locations of the targets 1 and 2.

However, the technique disclosed in Cited Document 1 estimates current locations of the targets 1 and 2 using past locations and speeds of the targets 1 and 2. Accordingly, the target 2 captured by the imaging unit 32a at the time t may be mistaken for the target 1 and the target 1 captured by the imaging unit 32a at the time t may be mistaken for the target 2. In this case, the electronic white board detects a ghost point g1 and a ghost point g2 at locations shown in FIG. 3-(c).

<Outline of Method for Preventing Detection of Ghost Points According to the Present Embodiment>

Figure 4:
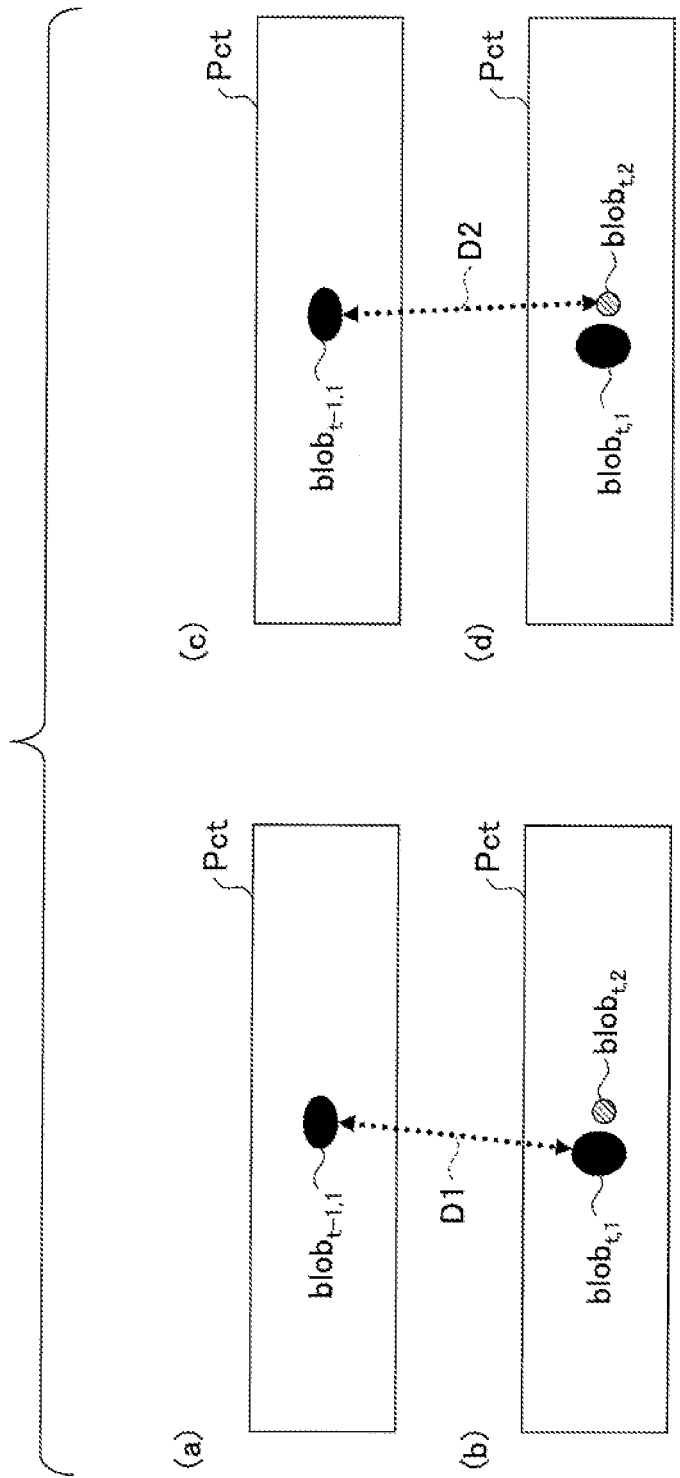
FIG. 4 is a diagram illustrating a method for preventing detection of ghost points if one imaging unit captures an image of only one target.

In the following, prevention of ghost points in $1_r$. mentioned above is described with reference to FIG. 4. It is assumed that arrangement of targets is the same as in FIG. 2-(a). FIG. 4 is a diagram illustrating a method for preventing detection of ghost points if one imaging unit 32 captures an image of only one target. FIG. 4-(a) to (d) show image Pcts captured by the imaging unit 32a. Only the target 1 is captured at the time t−1 and the targets 1 and 2 are captured at the time t.

In consideration of limitation of a drawing speed of a user and time intervals, the target at the time t must not have moved to a distant location relative to the target at the time t−1. The present embodiment uses this assumption to associate the target 1 or the target 2 at the time t with the target 1 at the time t−1. In other words, the target 1 or the target 2 at the time t is associated with the target 1 at the time t−1 such that a movement distance of the target 1 or 2 is minimized between the time 1 and the time t−1.

In this case, it is impossible for the electronic white board to obtain a movement distance with accuracy by merely comparing pixel locations of targets 1 and 2 at the time t with a pixel location of the target 1 at the time t−1. This is because even if a number of pixels between the two targets at the time t and the time t−1 is the same, a movement distance of the targets will be different between a case where the targets viewed from the imaging unit 32 are located at a distant place and a case where the targets are in proximity. Further, even if the targets are captured at the same pixel locations, the targets may be moving away from the imaging unit 32 or moving toward the imaging unit 32.

Accordingly, the electronic white board according to the present embodiment evaluates a distance that the target has moved from the time t−1 to the time t in consideration of a distance between the imaging unit 32 and the target as follows. In addition, detailed calculation will be described later.

First, the following process is performed with respect to the imaging unit 32a. For the sake of description, an image of a target i at the time t is represented by a $blob_{t,i}$ (i is an identification number of the target) and an image of the target i at the time t−1 is represented by a $blob_{t-1, i}$. According to FIG. 4-(a) and (b), while a $blob_{t, 1}$ and a $blob_{t,2}$ are obtained at the time t, only a $blob_{t-1, i}$ is obtained at the time t−1.

The electronic white board determines whether a square of a distance D1 between the $blob_{t, 1}$ and the $blob_{t-1, 1}$ or a square of a distance D2 between the $blob_{t,2}$ and the $blob_{t-1, 1}$ is smaller. In the smaller distance, the electronic white board associates the $blob_{t,i}$ at the time t with the $blob_{t-1, 1}$ at the time t−1. In accordance with this, it is possible to associate the target 1 or the target 2 at the time t with the target 1 at the time t−1. In other words it is possible to track the target 1 at the time t−1 and identify the target 1 at the time t.

In a formula, a distance D between blobs at the time t−1 and the time t is $D(blob_{t-1, 1}, blob_{t,i})$, i∈{1,2}. The electronic white board associates the $blob_{t-1, 1}$ with the $blob_{t,i}$ such that $D(blob_{t-1,1}, blob_{t,i})^2$ is minimized.

While it is impossible to directly obtain a distance from FIG. 4, FIG. 4-(a) and (b) show correct association and FIG. 4-(c) and (d) show erroneous association. Further, comparison of the square of the distance D1 and the square of the distance D2 is made using the following formula. The distance D1 and the distance D2 may be compared. However, if the squares are compared, processing load will be reduced because a square root need not be calculated.

Figure 5:
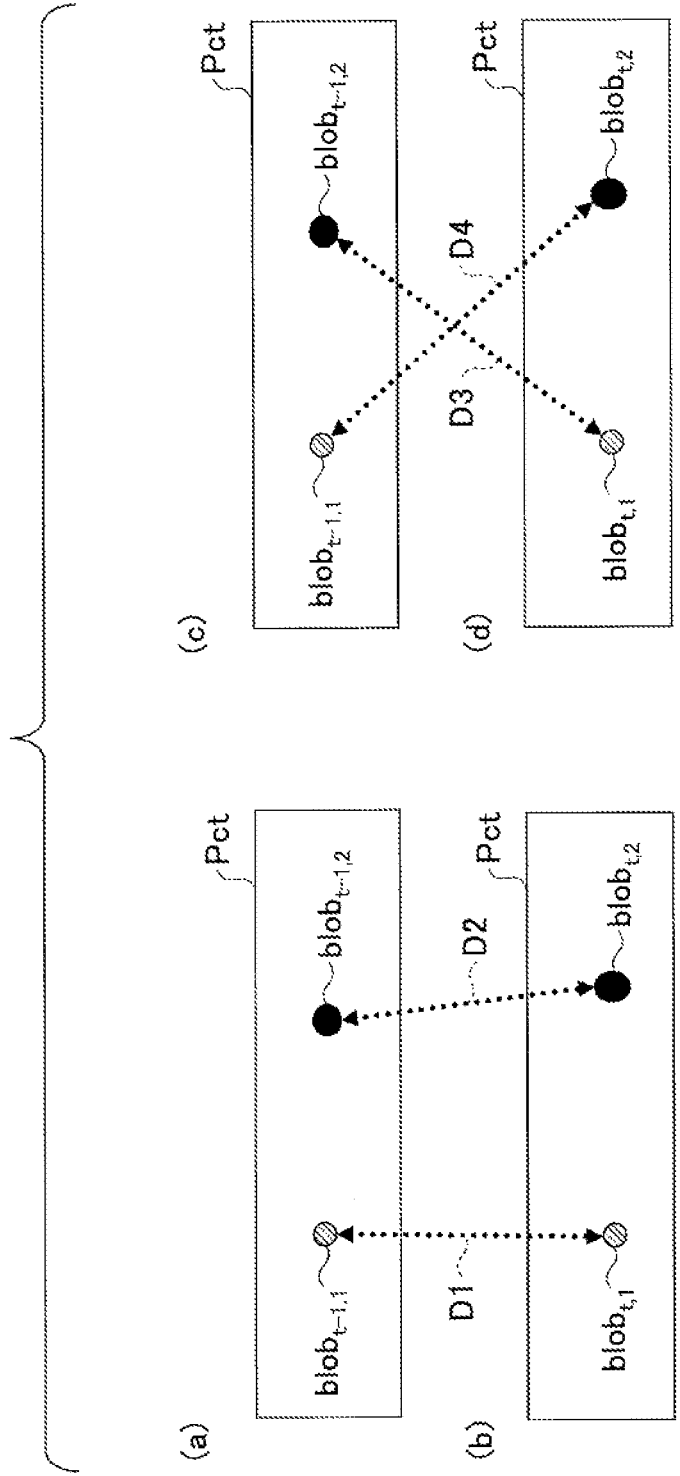
FIG. 5 is a diagram illustrating a method for preventing detection of ghost points if one imaging unit captures images of targets 1 and 2.

The same process is performed with respect to the imaging unit 32b. FIG. 5 is a diagram illustrating a method for preventing detection of ghost points if one imaging unit 32b captures images of targets 1 and 2.

Since the imaging unit 32b captures images of two targets 1 and 2 at the time t and the time t−1 as shown in FIG. 2-(a) and (b), four distances D1 to D4 are obtained. The electronic white board obtains a total 1 of a square of the distance D1 between the $blob_{t,1}$ and the $blob_{t-1, 1}$ and a square of the distance D2 between the $blob_{t,2}$ and a $blob_{t-1,2}$. In the same manner, the electronic white board obtains a total 2 of a square of the distance D3 between the $blob_{t, 1}$ and the $blob_{t-1,2}$ and a square of the distance D4 between the $blob_{t,2}$ and the $blob_{t-1,1}$.

Then the electronic white board determines whether the total 1 or the total 2 is smaller. In a smaller combination, a $blob_{t, 1\ or\ 2}$ at the time t is associated with a $blob_{t-1,1\ or\ 2}$ at the time t−1. In accordance with this, it is possible to associate the $blob_t$ at the time t with the $blob_{t-1}$ at the time t−1. In other words, it is possible to track the targets 1 and 2 at the time t−1 and identify the targets 1 and 2 at the time t.

In a formula, $D(blob_{t-1, 1}, blob_{t,i})^2 + D(blob_{t-1,2}, blob_{t,j})^2$, (i,j)∈{(1,2), (2,1)}. The electronic white board associates the $blob_{t-1}$ with the $blob_t$ such that the total of the squares of the distances D are minimized.

While correct association is not clear from FIG. 5, FIG. 5-(a) and (b) show correct association and FIG. 5-(c) and (d) show erroneous association. Further, comparison of the totals of the squares of the distances D is made using the following formula. The totals of the distances D may also be compared.

The electronic white board performs triangulation using this association information and calculates locations of coordinates of a plurality of objects, so that the electronic white board can prevent occurrence of a ghost point.

Figure 6:
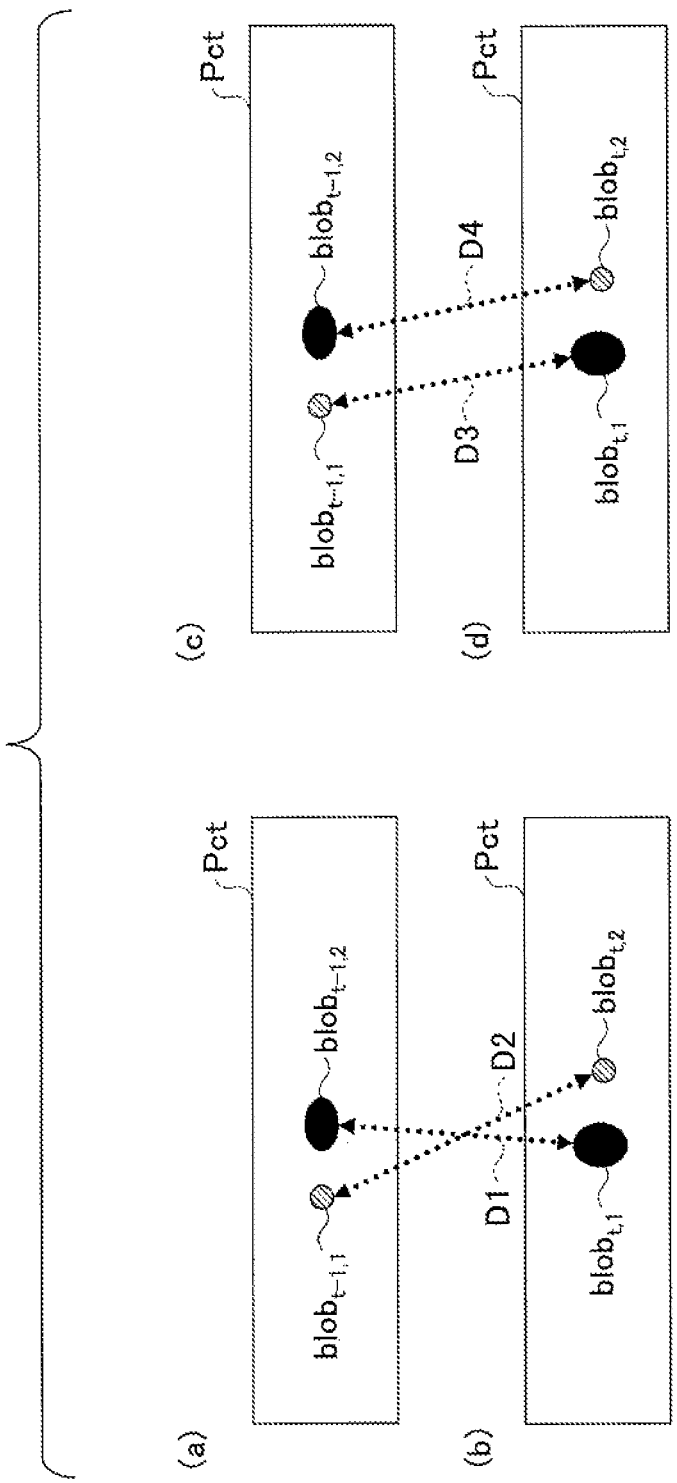
FIG. 6 is a diagram illustrating a method for preventing detection of ghost points if one imaging unit captures images of two targets 1 and 2.

In the following, prevention of ghost points in 2. mentioned above is described with reference to FIG. 6. It is assumed that arrangement of targets is the same as in FIG. 3-(a). FIG. 6 is a diagram illustrating a method for preventing detection of ghost points if one imaging unit 32a captures images of two targets 1 and 2.

Since the imaging unit 32a captures images of the two targets at the time t and the time t−1, four distances D1 to D4 are obtained. The electronic white board obtains a total 1 of a square of the distance D1 between the $blob_{t, 1}$ and the $blob_{t-1, 2}$ and a square of the distance D2 between the $blob_{t,2}$ and the $blob_{t-1, 1}$. In the same manner, the electronic white board obtains a total 2 of a square of the distance D3 between the $blob_{t, 1}$ and the $blob_{t-1, 1}$ and a square of the distance D4 between the $blob_{t,2}$ and the $blob_{t-1, 2}$.

Then the electronic white board determines whether the total 1 or the total 2 is smaller. In a smaller combination, a $blob_{t, 1\ or\ 2}$ at the time t is associated with a $blob_{t-1,1\ or\ 2}$ at the time t−1. In accordance with this, it is possible to associate the $blob_t$ at the time t with the $blob_{t-1}$ at the time t−1.

In a formula, $D(blob_{t-1, 1}, blob_{t,i})^2 + D(blob_{t-1,2}, blob_{t,j})^2$, (i,j)∈{(1,2), (2,1)}. The electronic white board associates the $blob_{t-1}$ with the $blob_t$ such that the total of the squares of the distances D is minimized.

While correct association is not clear from FIG. 6, FIG. 6-(c) and (d) show correct association and FIG. 6-(a) and (b) show erroneous association. Further, comparison of the totals of the squares of the distances D is made using the following formula. The totals of the distances D may also be compared.

With respect to prevention of ghost points in 2. mentioned above, since association of the $blob_t$ with the $blob_{t-1}$ from the imaging unit 32b is the same as in FIG. 5 and the description thereof, illustration is omitted.

Configuration Example

Figure 7:
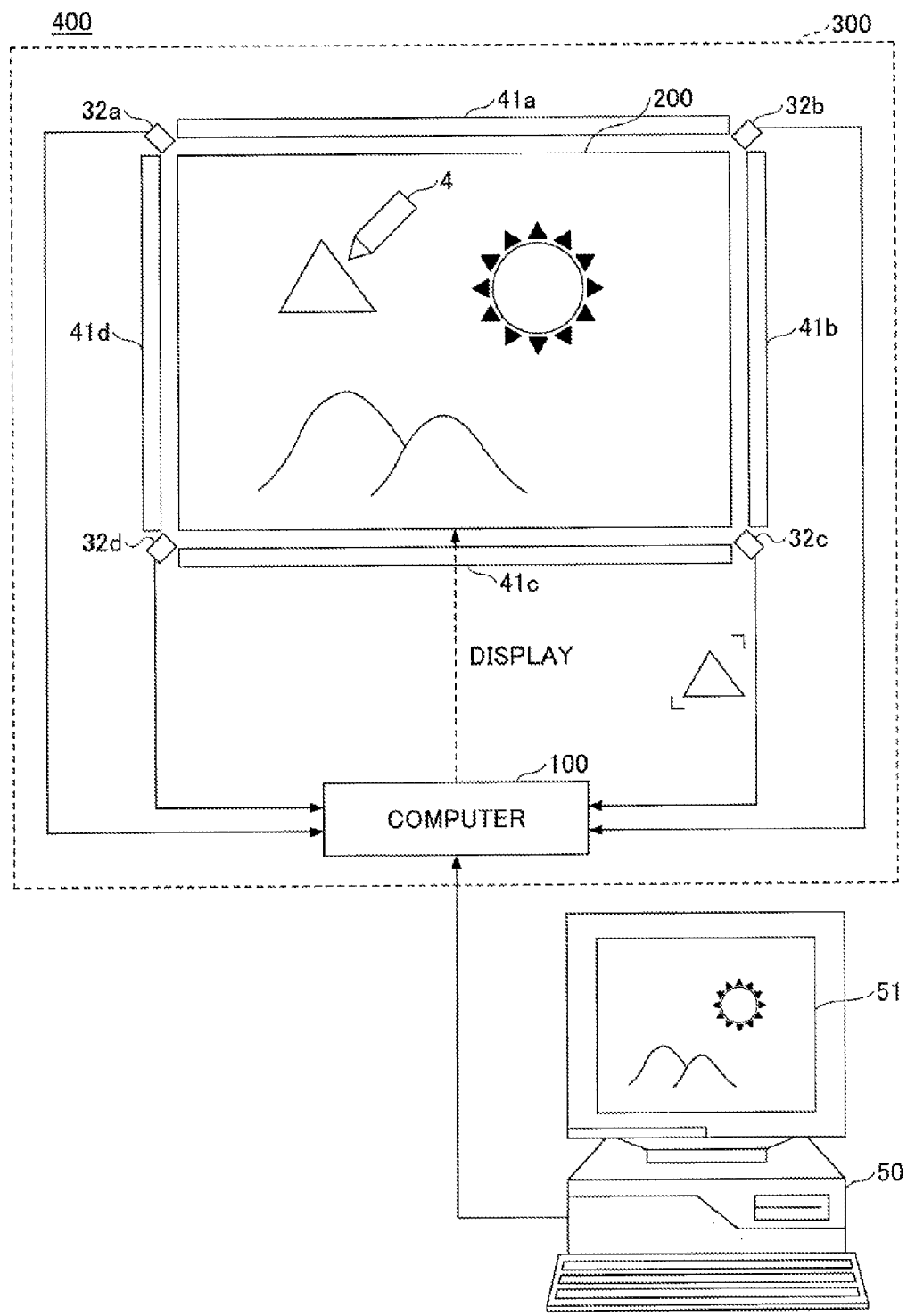
FIG. 7 is a schematic diagram of a drawing system.

FIG. 7 is a schematic diagram of a drawing system 400 according to the present embodiment. The drawing system 400 includes the display 200, four imaging units 32a to 32d (also referred to as the "imaging unit 32" if the imaging unit(s) is described without distinction), and four retro-reflection plates 41a to 41d (also referred to as the "retro-reflection plate 41" if the retro-reflection plate(s) is described without distinction), and a computer 100. The computer 100 is an example of an optical positional information detection apparatus. Further, an image output device 50 is connected to the computer 100, but the image output device 50 may be eliminated. In other words, an electronic white board 300 includes as least the display 200 and the computer 100 and may include other constituent elements where necessary.

The display 200 may be a liquid crystal display, a plasma emission display, an organic EL display, an electrophoretic display, or a Field Emission Display (FED) regardless of a display type. Further, the display 200 may be constituted using a self light-emitting device or a projection device that projects an image such as a projector or a rear projector. In the present embodiment, the display 200 does not need to include a touch panel but may include the touch panel.

The four retro-reflection plates 41a to 41d may be disposed in a fixed manner or may be installed detachably around the display 200. This is because the retro-reflection plate 41 is not necessary for drawing where an electronic pen is used. However, if the retro-reflection plate 41 is present, a user can input coordinates using an indication member without a light-emitting unit.

A program for a drawing system that supports the drawing system 400 described below is installed on the computer 100. When the computer 100 executes this program for a drawing system, the computer 100 detects coordinates indicated by the user with an electronic pen 4 based on an image captured by the imaging unit 32. The computer 100 draws visual information such as a dot or a line on the display 200 based on the coordinates.

Further, when the computer 100 displays a list of items (an example of the visual information) for receiving an operation for the drawing system 400, the computer 100 determines which item is selected based on coordinates and receives the operation.

For example, when the user touches an item to draw a line and then draws a figure on the display surface of the display 200 using the electronic pen 4, the computer 100 obtains, in real time, coordinates of a location where the electronic pen 4 is in contact and creates time-series coordinates. The computer 100 connects the time-series coordinates to create a line and displays the line on the display 200. The user can set a color and a thickness of the line from the list of items.

In FIG. 7, the user moves the electronic pen 4 along a shape of a triangle, so that the computer 100 records a series of coordinates that constitutes the triangle. Then the computer 100 combines an image output by the image output device 50 on a display 51 with the triangle (a resultant image where the image is combined with the triangle is an example of visual information) and displays the combined image on the display 200. The user sees as if the user draws the triangle on the display 200.

In this manner, even if the display 200 does not include a touch panel, the user can perform various operations on the drawing system 400. Further, by using the retro-reflection plate 41, the user can operate the drawing system 400 with the finger or a general-purpose pointer without using the electronic pen 4.

Figure 8:
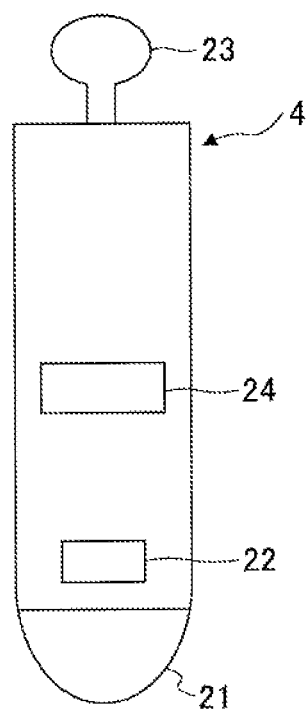
FIG. 8 is a schematic configuration diagram of an electronic pen.

In the following, a structure of the electronic pen 4 is described with reference to FIG. 8. FIG. 8 is a schematic configuration diagram of the electronic pen 4. The electronic pen 4 includes a tip unit 21 that emits infrared light, a contact detection unit 22 that detects pen pressure when the tip unit 21 is brought into physical contact with the display surface of the display 200, a wireless communication unit 23 that wirelessly reports pen pressure detected by the contact detection unit 22 to the computer 100, and a CPU 24 that controls the entire electronic pen 4. In addition, the electronic pen 4 has a configuration including a RAM and a ROM as in an information processing device such as a microcomputer.

The contact detection unit 22 can detect the tip unit 21 brought into contact with the display surface or moving away from the display surface by comparing the pen pressure with a threshold. The electronic pen 4 may store attribute information such as a unique ID in the ROM, for example. While the wireless communication unit 23 communicates with the computer 100 via Bluetooth (registered trademark), for example, the wireless communication unit 23 may perform communication via infrared, ultrasonic, or visible light communication, for example.

The wireless communication unit 23 can transmit not only the pen pressure but also contact or non-contact information and the ID. In such a configuration, the computer 100 can identify each electronic pen 4 that transmits the contact or non-contact information. In addition, even if the wireless communication unit 23 does not transmit the pen pressure or the contact or non-contact information to the computer 100, the user can draw visual information such as a dot or a line on the display 200.

The CPU 24 of the electronic pen 4 causes the light-emitting unit of the tip unit 21 to emit light only if the contact detection unit 22 detects pen pressure equal to or more than the threshold. In accordance with this, it is possible to reduce power consumption. Or the light-emitting unit may always emit light. In this case, a sensor to estimate a usage state by the user such as an acceleration sensor is disposed, so that the CPU 24 determines whether the user is using the electronic pen 4 in accordance with an output of the acceleration sensor and turns off the light when the electronic pen 4 is not in use.

Figure 9:
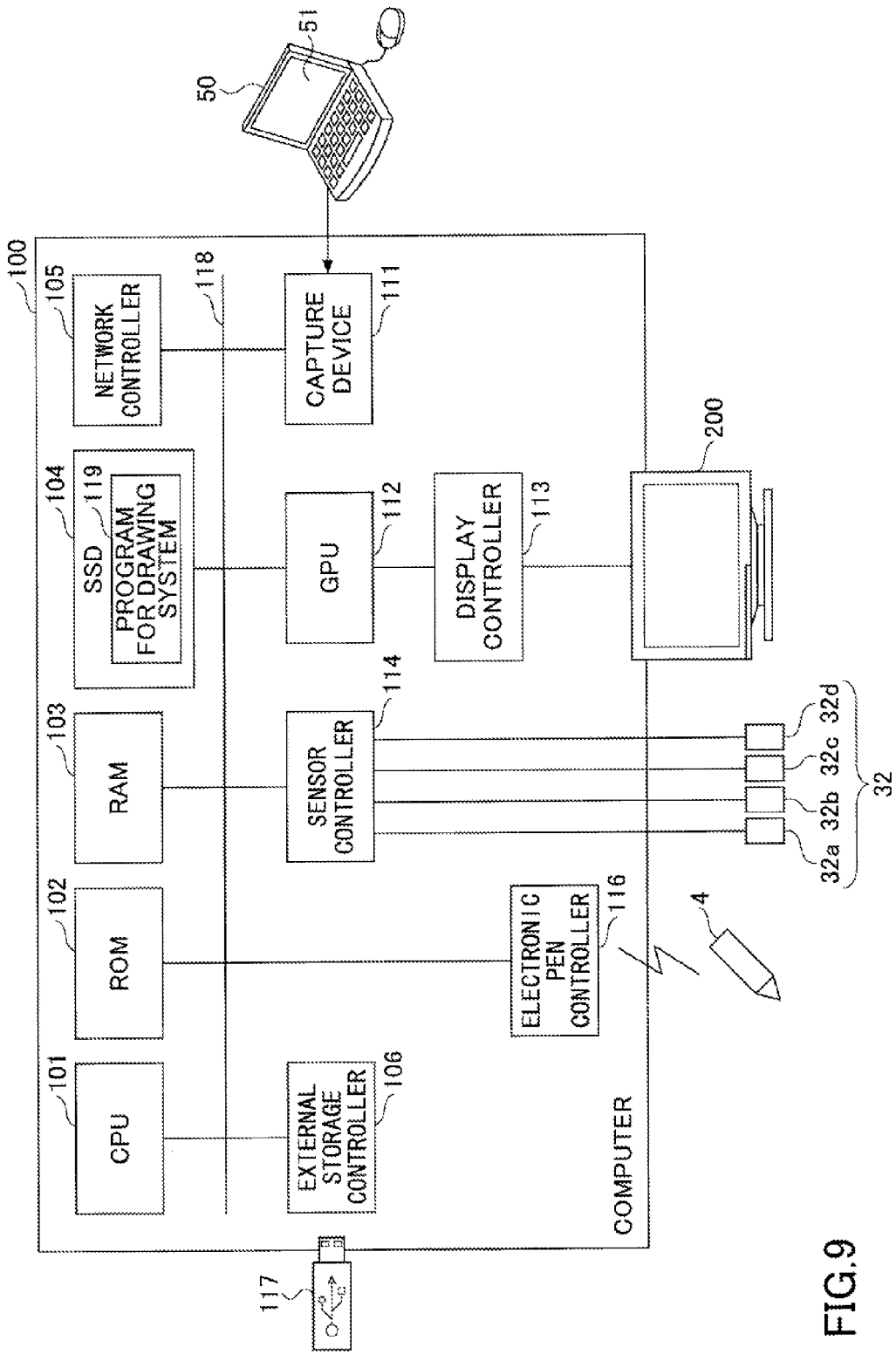
FIG. 9 is a hardware configuration diagram of a computer.

In the following, a hardware configuration of the computer 100 is described with reference to FIG. 9. FIG. 9 is a hardware configuration diagram of the computer 100. The computer 100 includes a CPU 101, a ROM 102, a RAM 103, a Solid State Drive (SSD) 104, a network controller 105, an external storage controller 106, an electronic pen controller 116, a sensor controller 114, a Graphics Processor Unit (GPU) 112, and a capture device 111 electrically connected to one another via a bus line 118 such as an address bus or a data bus. Further, the computer 100 according to the present embodiment includes a display controller 113 connected to the GPU 112.

The CPU 101 executes a program 119 for a drawing system to control an operation of the drawing system 400 as a whole. The ROM 102 stores a program such as an Initial Program Loader (IPL) mainly executed by the CPU 101 when the drawing system 400 starts up. The RAM 103 is a working memory when the CPU 101 executes the program 119 for a drawing system. The SSD 104 is a non-volatile memory in which the program 119 for a drawing system and various types of data are stored.

The network controller 105 performs a process based on a communication protocol when communicating with another device via a network. The network may be a LAN or a WAN in which a plurality of LANs are connected, for example. The WAN may be the Internet. The network may include a mobile phone network. Further, the network controller 105 may be connected directly to another device via a dedicated line. The other device includes not only a server but also another drawing system 400. When the network controller 105 is connected to the other drawing system 400, the user can transmit and receive drawing contents to and from the other drawing system 400 such that the drawing system 400 of a relevant site can display the same drawing contents on the display 200 thereof.

The external storage controller 106 reads or writes from or into a removable external memory 117 in response to an instruction from the CPU 101. The external memory 117 may be a flash memory such as a USB memory or an SD card.

The electronic pen controller 116 wirelessly communicates with the wireless communication unit 23 of the electronic pen 4 and receives contact or non-contact information that indicates whether the tip unit 21 is brought into contact with the display surface and pen pressure, for example. In accordance with this, the computer 100 can detect whether the user is drawing with the electronic pen 4. In addition, if the computer 100 does not communicate with the electronic pen 4, the electronic pen controller 116 may be eliminated.

The sensor controller 114 is connected to the four imaging units 32a to 32d. The imaging units 32a to 32d may be a CMOS or CCD image sensor for obtaining a two-dimensional image or may be an image sensor for obtaining a one-dimensional image such as a linear image sensor. Further, the imaging units 32a to 32d may refer to a type of device that detects light in an area or in a linear manner such as a Position Sensitive Detector (PSD).

At least two imaging units 32 are necessary to detect one set of coordinates. As shown in FIG. 7, the imaging unit 32 is disposed at a corner of the display 200 such that an optical axis is directed in substantially parallel with the display surface of the display 200. In accordance with this, it is possible to capture an image of an indication member close to the display surface (within a predetermined distance from the display surface). Such an imaging range may be referred to as a peripheral portion.

If a number of the imaging units 32 is greater, a number of coordinates that can be simultaneously detected is increased. The sensor controller 114 detects coordinates based on triangulation from image Pcts (pixels) captured by the imaging units 32a to 32d. Details of detection are described later.

The capture device 111 captures an image that the image output device 50 displays on the display 51.

The GPU 112 is a processor dedicated to rendering that calculates a pixel value of each pixel on the display 200. The display controller 113 outputs an image created by the GPU 112 to the display 200.

The program 119 for a drawing system may be stored in the external memory 117 and distributed or may be downloaded via the network controller 105 from a server of a manufacturer of the drawing system 400 or a server of a company designated by the manufacturer. Further, the program 119 for a drawing system may be distributed in a distributed format or in an executable format.

<<Functions of Coordinate Detection System>>

Figure 10:
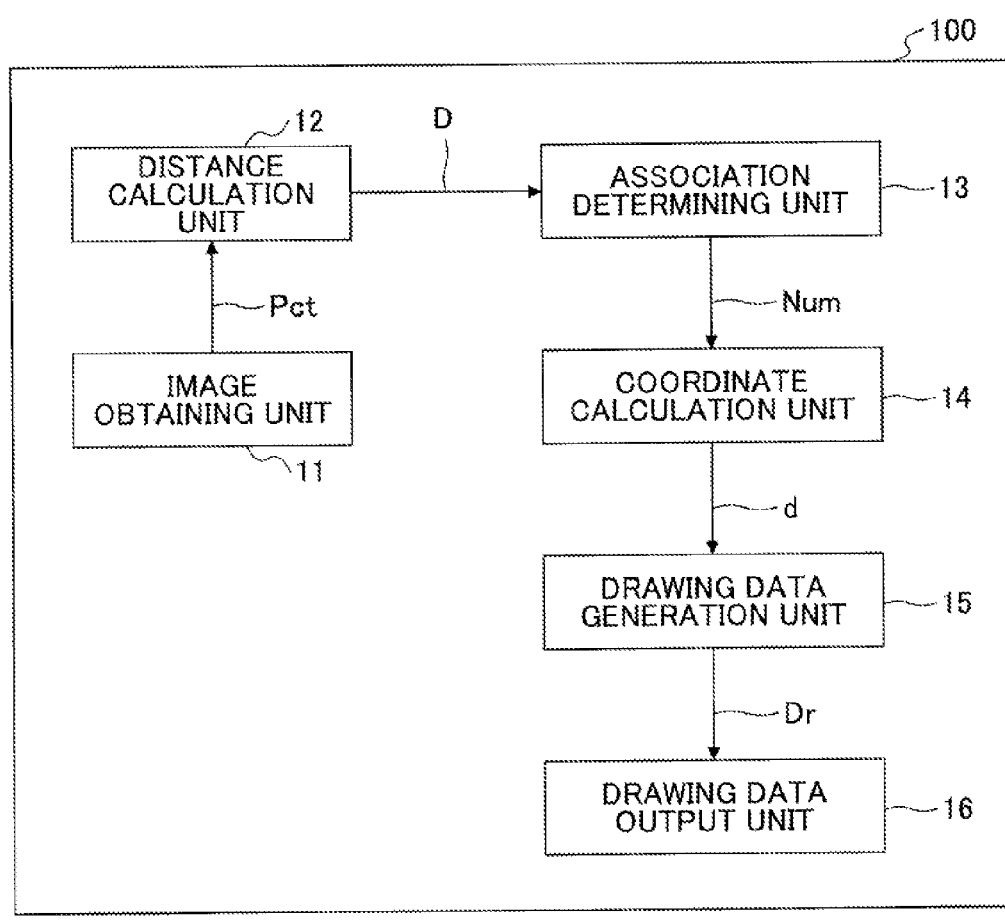
FIG. 10 is a functional block diagram of a computer.

FIG. 10 is a functional block diagram of the computer 100. The computer 100 according to the present embodiment includes an image obtaining unit 11, a distance calculation unit 12, an association determining unit 13, a coordinate calculation unit 14, a drawing data generation unit 15, and a drawing data output unit 16. The image obtaining unit 11, the distance calculation unit 12, the association determining unit 13, the coordinate calculation unit 14, the drawing data generation unit 15, and the drawing data output unit 16 are functions or units implemented when the CPU 101 of the computer 100 executes the program 119 for a drawing system loaded in the RAM 103 and controls the hardware shown in FIG. 9. In addition, the computer 100 has many functions other than those shown in the drawings, so that a function which is not a main feature of the present embodiment may not be shown in the drawings.

The image obtaining unit 11 obtains an image Pct captured by the imaging unit 32. In FIG. 9, four imaging units 32 are shown, so that the image obtaining unit 11 obtains four image Pcts. In the following description, it is assumed that the imaging unit 32 has two imaging units 32a and 32b.

The distance calculation unit 12 calculates a distance D between a $blob_{t-1}$ (see FIG. 11) captured in an image Pct at the time t−1 and a $blob_t$ captured in an image Pct at the time t by the same imaging unit 32 on the display surface of the display 200.

The association determining unit 13 determines, based on the distance D, which $blob_{t-1}$ in the image Pct at the time t−1 is associated with the $blob_t$ in the image Pct at the time t. Details of association are described later. The association determining unit 13 gives the same blob number num to blobs identified by the association. When the same blob number num is given to the same blobs in the image Pct of the imaging unit 32a and in the image Pct of the imaging unit 32b (for example, the same blob number num is given to blobs captured simultaneously for the first time by the imaging unit 32a and the imaging unit 32b), it is possible to associate blobs in the two image Pcts captured by the imaging unit 32a and the imaging unit 32b.

The coordinate calculation unit 14 uses blobs of the same blob number num to calculate coordinates based on triangulation from the blob in the image Pct captured by the imaging unit 32a and the blob in the image Pct captured by the imaging unit 32b. While coordinate data d is output to the drawing data generation unit 15, if a plurality of blobs are detected, a plurality of sets of coordinate data d are output. In this case, the coordinate data d is provided with an identification number. Since the association determining unit 13 has associated the blobs of the time t and the time t−1, it is possible to prevent detection of ghost points.

The drawing data generation unit 15 draws an image Pct such as handwriting on the display 200. The drawing data generation unit 15 generates drawing data Dr by interpolating sets of coordinate data of the same blob from the coordinate calculation unit 14 using a polynomial, for example. In this case, the user can specify a color, a density, and a width of a line. The drawing data output unit 16 outputs the drawing data Dr to the GPU 112.

There are mainly two methods by which the image obtaining unit 11 obtains an image Pct. One method is to capture an image of light emitted by the light-emitting unit of the electronic pen 4. In this case, the electronic pen 4 detects that pressure equal to a threshold or more is applied to the pen tip and transmits a contact signal. The computer 100 switches off a light source that illuminates the retro-reflection plate 41 so that the imaging unit 32 can readily capture an image of the light-emitting unit.

The other method is to capture an image of shadow (shaded portion) formed by an indication member such as the finger (light shield method). In this case, since the electronic pen controller 116 of the computer 100 does not receive the contact signal, the computer 100 switches on the light source that illuminates the retro-reflection plate 41. In accordance with this, the retro-reflection plate 41 reflects light, so that the imaging unit 32 can readily capture an image of shadow created by the finger, for example. In addition, the retro-reflection plate 41 may be self-luminous.

In the present embodiment, unless specifically mentioned, it is possible to associate a $blob_t$ at the time t with a $blob_{t-1}$ at the time t−1 in the same manner when the image obtaining unit 11 obtains an image Pct in either of the two methods.

<Calculation of Distance>

Figure 11:
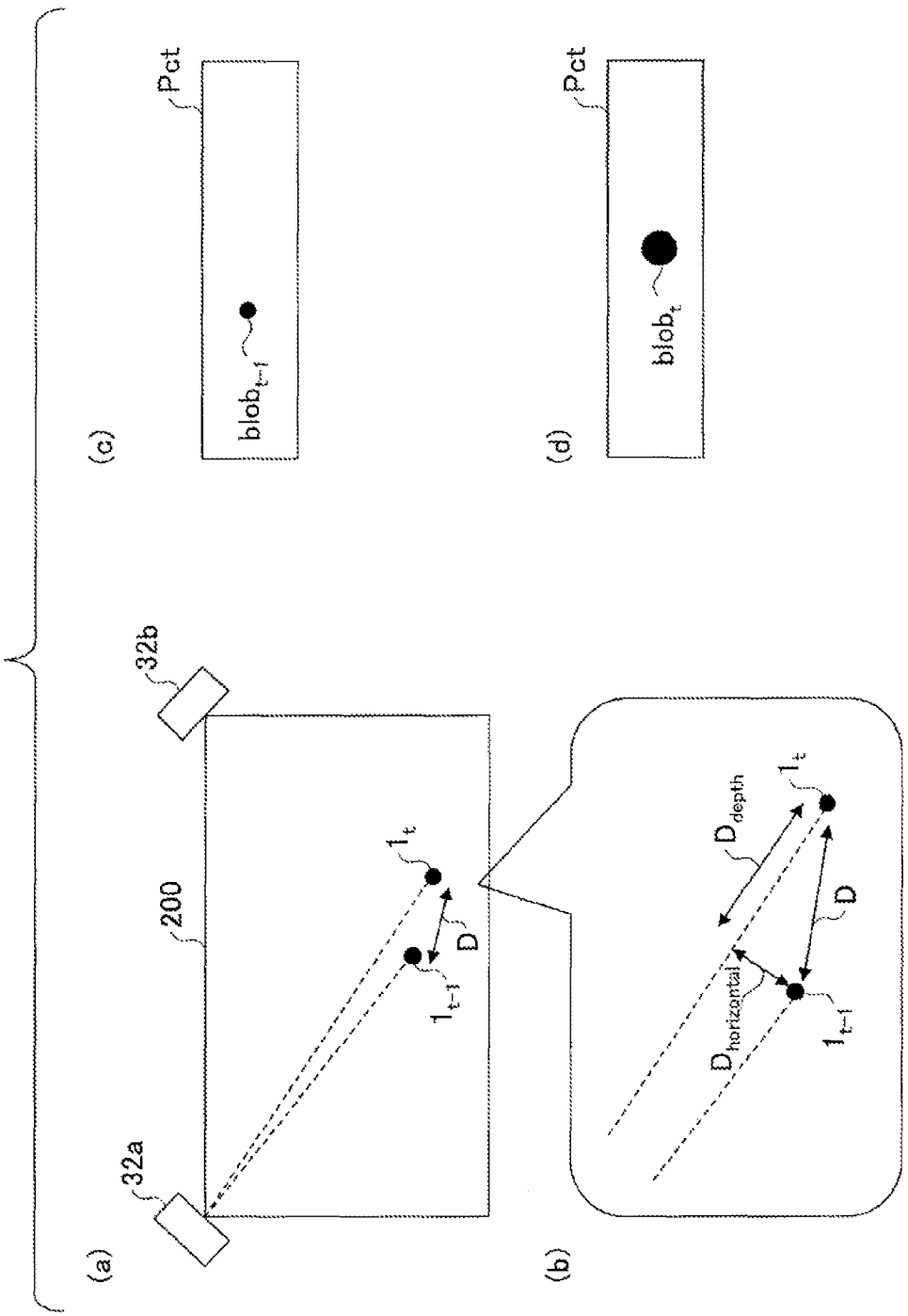
FIG. 11 is a diagram illustrating two components that constitute a distance D calculated by a distance calculation unit.

Calculation of a distance D between the $blob_{t-1}$ at the time t−1 and the $blob_t$ at the time t is described with reference to FIGS. 11 to 13. FIG. 11 is a diagram illustrating two components that constitute the distance D to be calculated by the distance calculation unit 12. FIG. 11-(a) shows locations of a target and a target $1_t$ at the time t−1 and the time t and FIG. 11-(b) is an enlarged view showing arrangement of the target of FIG. 11-(a). FIG. 11-(c) shows a $blob_{t-1}$ of the target $1_{t-1}$ captured by the imaging unit 32a at the time t−1 and FIG. 11-(d) shows a $blob_t$ of the target $1_t$ captured by the imaging unit 32a at the time t.

It is assumed that the target and the target $1_t$ are the same target and a distance between the target $1_{t-1}$ at the time t−1 and the target $1_t$ at the time t is D. Relative to a given imaging unit 32 (imaging unit 32a in FIG. 11), the distance D is divided into a component in a direction of a straight line that connects the imaging unit 32a to the target 1 (hereafter a "depth direction component D_depth") and a horizontal direction component D_horizontal orthogonal to the depth direction component D_depth. The distance D is approximated by a square root of a sum of a square of the depth direction component D_depth and a square of the horizontal direction component D_horizontal.

In the following, the horizontal direction component D_horizontal and the depth direction component D_depth are calculated from only a feature amount of a blob of a target captured by the imaging unit 32a. Examples of the feature amount include a location of the blob in a horizontal direction in an image Pct, a width, an area, a height of the blob, and an accumulated value of brightness values.

<<Horizontal Direction Component D_Horizontal>>

Figure 12:
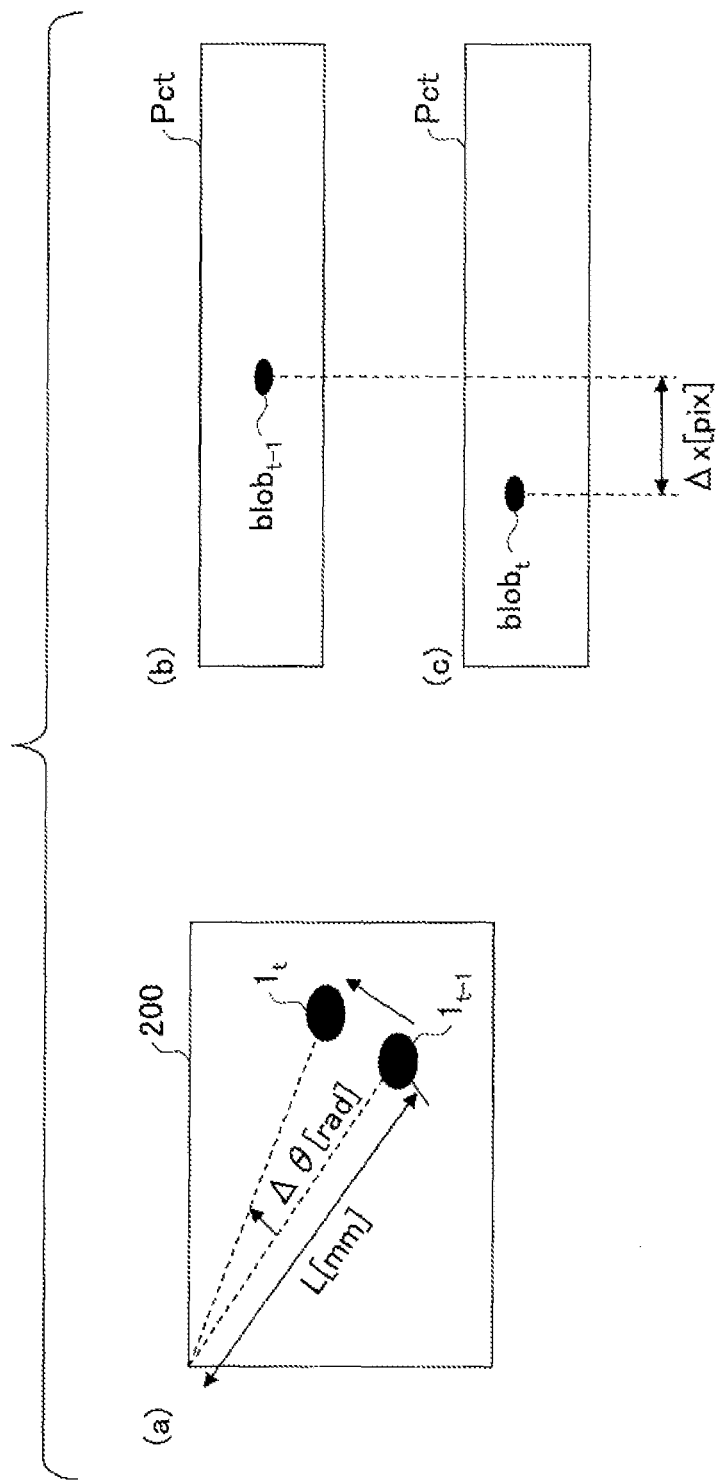
FIG. 12 is a diagram schematically illustrating calculation of a horizontal direction component D_horizontal.

FIG. 12 is a diagram schematically illustrating calculation of the horizontal direction component D_horizontal. It is assumed that a distance from the target $1_{t-1}$ or the target $1_t$ to the imaging unit 32a is L mm (the distance L is assumed to be constant at the time t and the time t−1) and resolution of the imaging unit 32a in a horizontal direction is k pix/rad. It is also assumed that a difference in the horizontal direction between a center (horizontal location) of the $blob_t$ at the time t and a center (horizontal location) of the $blob_{t-1}$ at the time t−1 is Δx pix.

Accordingly, it is possible to approximate the horizontal direction component D_horizontal as follows.

Formula 1

$$D_{horizontal}(blob_{t-1}, blob_t) \approx L \cdot \tan(\Delta\theta) \approx L \cdot (\Delta\theta \text{ [rad]}) \approx L \frac{\Delta x}{k} \quad (1)$$

In addition, $\tan \Delta\theta \approx \Delta\theta$ holds when Δθ is very small. Further, although the distance L is still unclear, the distance L is described in Formula 3 and Formula 4. As shown in Formula 3 and Formula 4, the horizontal direction component D_horizontal is calculated using not only the horizontal location of the blob but also the width of the blob.

<<Depth Direction Component D_Depth>>

Figure 13:
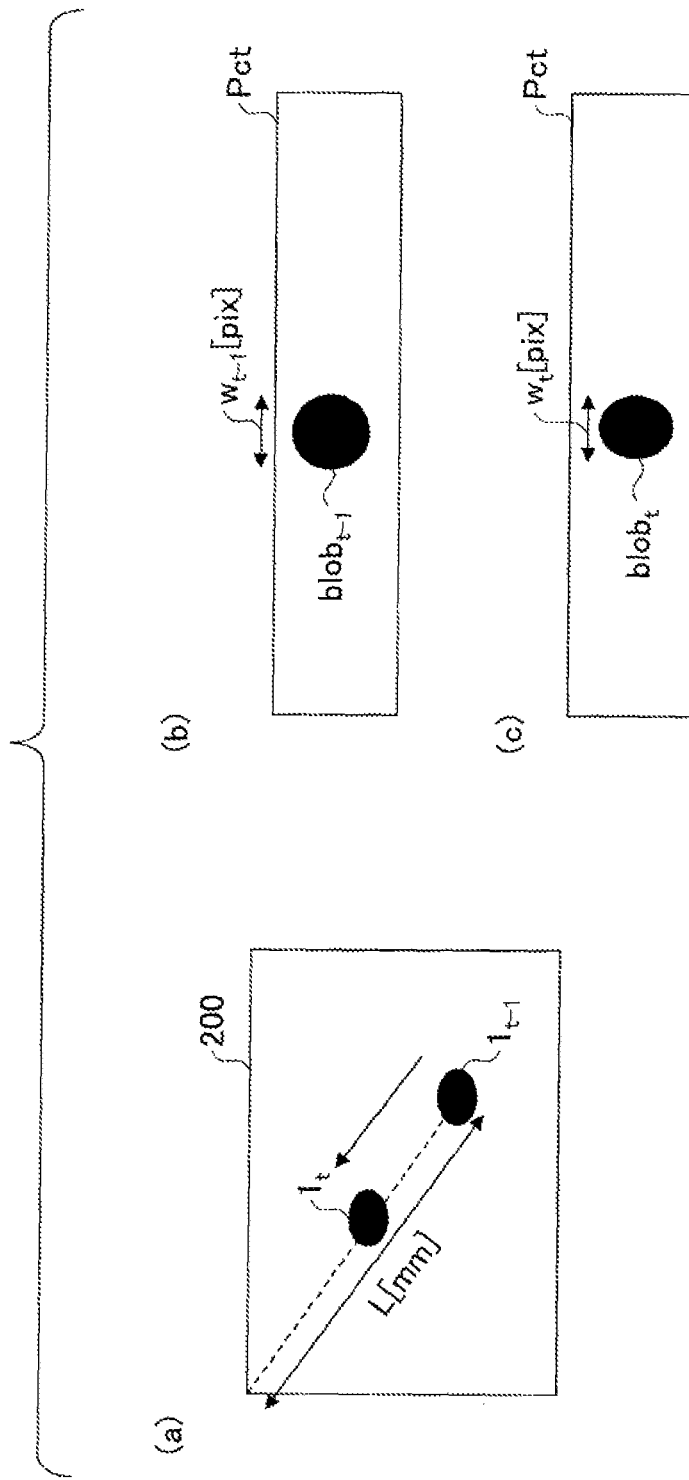
FIG. 13 is a diagram schematically illustrating calculation of a depth direction component D_depth.

FIG. 13 is a diagram schematically illustrating calculation of the depth direction component D_depth. It is assumed that a distance from the target to the imaging unit 32a is L mm. Further, it is also assumed that a width of the $blob_{t-1}$ at the time t−1 is $w_{t-1}$ pix and a width of the $blob_t$ at the time t is $w_t$ pix. Further, for calculation, an intermediate time t−½ between the time t and the time t−1 is introduced. The distance calculation unit 12 calculates the depth direction component D_depth using an amount of change of the width of the $blob_{t-1}$ between the time t and the time t−1.

If the target $1_{t-1}$ does not move in a depth direction, the width of the blob is not changed (depth direction component D_depth is zero). Further, if the target $1_{t-1}$ moves farther from the imaging unit 32a, the blob becomes smaller. For approximation, it is assumed that if the target moves as much as the distance L in the depth direction, the width of the blob becomes zero (the depth direction component D_depth is L). From this assumption, the depth direction component D_depth is calculated as follows.

Formula 2

$$D_{depth}(blob_{t-1}, blob_t) \approx L_{t-1} \left| 1 - \frac{w_t}{w_{t-1}} \right| \approx \quad (2)$$

$$L_{t-\frac{1}{2}} \left| \frac{w_t}{w_{t-\frac{1}{2}}} - 1 \right| + L_{t-\frac{1}{2}} \left| 1 - \frac{w_{t-1}}{w_{t-\frac{1}{2}}} \right| \approx$$

$$L_{t-\frac{1}{2}} \frac{|w_{t-1} - w_t|}{w_{t-\frac{1}{2}}} \approx L_{t-\frac{1}{2}} \frac{\Delta w}{w_{t-\frac{1}{2}}},$$

WHERE $w_{t-\frac{1}{2}} = \frac{w_{t-1} + w_t}{2}$ and $\Delta w = |w_{t-1} - w_t|$ In addition, instead of using the width of the blob, it is possible to use an area or a height of the blob, or an accumulated value of brightness values to calculate the D_depth. Further, at least two of these values may be used in order to calculate the D_depth.

<<Calculation of Distance D when Distance L is Estimated>>

Since the horizontal direction component D_horizontal and the depth direction component D_depth are obtained in accordance with this, it is possible to calculate the distance D by estimating the distance L.

While the distance L is assumed to be calculated as a value at the time t−½ for description, it is possible to calculate a value at the time t or the time t−1. The distance L is estimated as follows using a diameter R mm of a light-emitting body and using the fact that a size of the blob becomes smaller as the target moves from the imaging unit 32a farther. In addition, the diameter R mm of the light-emitting body is converted to pixels based on the resolution k pix/rad. Since there is a relationship L≈k·R/w, the distance L is expressed by the following formula.

Formula 3

$$L = \frac{k[pix/\text{rad}] \times R[\text{mm}]}{w[pix]} \quad (3)$$

When Formula 3 is used, a square of the distance D is expressed as follows from Formula 1 and Formula 2.

Formula 4

$$D^2(blob_{t-1}, blob_t) \approx L_{t-\frac{1}{2}}^2 \left[ \left( \frac{\Delta w}{w_{t-\frac{1}{2}}} \right)^2 + \frac{(\Delta x)^2}{k^2} \right] \quad (4)$$

$$\approx \left( \frac{k[pix/\text{rad}] \times R[\text{mm}]}{w_{t-\frac{1}{2}}[pix]} \right)^2 \left\{ \left( \frac{\Delta w}{w_{t-\frac{1}{2}}} \right)^2 + \frac{(\Delta x)^2}{k^2} \right\}$$

$$\approx R^2 \left\{ \frac{k^2(\Delta w)^2}{\left(w_{t-\frac{1}{2}}\right)^4} + \frac{(\Delta x)^2}{\left(w_{t-\frac{1}{2}}\right)^2} \right\}$$

The distance calculation unit 12 uses Formula 4 to eventually calculate the square of the distance D.

Further, a left side of a term in parentheses in Formula 4 results from the depth direction component D_depth and a right side of the term results from the horizontal direction component D_horizontal. While the depth direction component D_depth and the horizontal direction component D_horizontal have the same weight in Formula 4, the components may be differently weighted.

Formula 5

$$D^2(blob_{t-1}, blob_t) \approx R^2 \left\{ \alpha \frac{k^2(\Delta w)^2}{\left(w_{t-\frac{1}{2}}\right)^4} + \beta \frac{(\Delta x)^2}{\left(w_{t-\frac{1}{2}}\right)^2} \right\} \quad (5)$$

Preferably, $\alpha < \beta$. This is because although the width of the blob is used when the depth direction component D_depth is calculated, if a bright point is present far away from the imaging unit 32, a width of the bright point may become as small as several pixels. In such a case, if the width of the bright point changes by only one pixel between the time t−1 and the time t, the depth direction component D_depth will be greatly different in appearance. In other words, the depth direction component D_depth is likely to be influenced by observation error. Or $\alpha$ may be zero. If resolution of an image sensor of the imaging unit 32 is sufficiently high, $\alpha = \beta$ or $\alpha > \beta$ may be used.

Since the distance D is used in order to compare sizes, the distance L may be represented by a diameter R which is a predetermined value (as long as the distance L can be calculated to be a multiple of the diameter R). While it is not necessary to set a correct value of the diameter R accordingly, calculation may be made based on R=5 mm if the electronic pen 4 has a pen tip of 5 mm in diameter.

The distance calculation unit 12 calculates a square of the distance D using Formula 4 each time the imaging unit 32 captures an image Pct. One image Pct may include two blobs or more, so that for one $blob_t$ at the time t, a square of the distance D is calculated for combinations with all $blobs_{t-1}$ at the time t−1 as mentioned above. If a plurality of blobs are captured at the time t and the time t−1, a sum of squares of the distances D is calculated.

The association determining unit 13 associates the $blob_t$ in the image Pct at the time t with the $blob_{t-1}$ at the time t−1 in one of the combinations where the square of the distance D or the sum of the squares of the distances D is the smallest. By associating blobs whose distance D is the smallest, it is possible to take account of the assumption that a movement distance in a short time will not be very great and to prevent detection of a ghost point.

<<Another Application of Electronic White Board According to Present Embodiment>>

The method for preventing detection of ghost points according to the present embodiment can be suitably applied to a case where three targets or more are detected.

If a third blob is captured as noise

Figure 14:
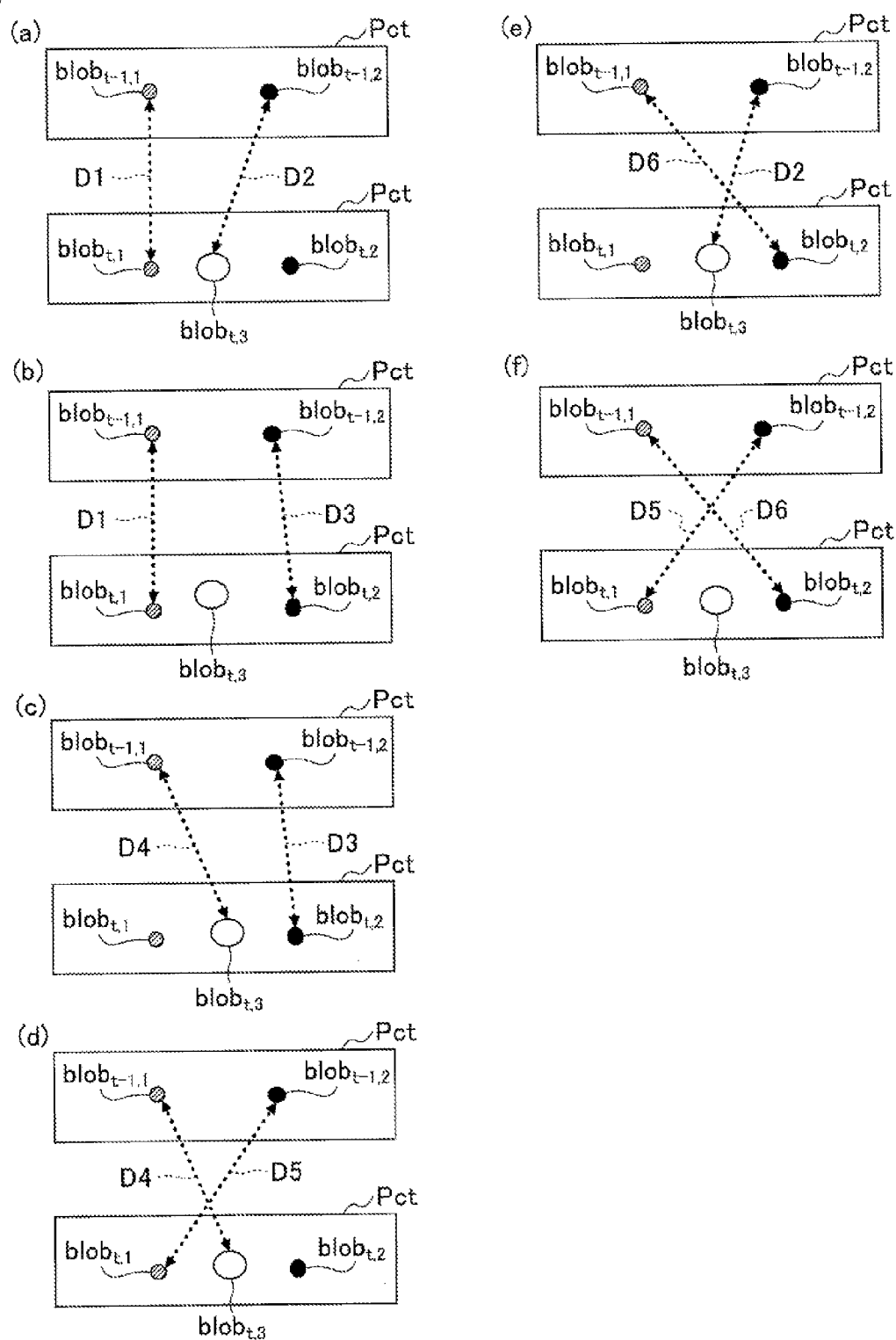
FIG. 14 is a diagram illustrating association if a third blob appears at a time t.

As shown in FIG. 14, even if noise is captured as a $blob_{t,3}$, the association determining unit 13 can correctly associate the $blob_t$ at the time t with the $blob_{t-1}$ at the time t−1. FIG. 14 is a diagram illustrating association if the third $blob_{t,3}$ appears at the time t. The distance calculation unit 12 calculates the distance D while combining any $blob_t$ at the time t with any $blob_{t-1}$ at the time t−1. In accordance with this, distances D1 to D6 shown in FIG. 14 are calculated.

The association determining unit 13 calculates a sum of a square of the distance D1 and a square of the distance D2, a sum of the square of the distance D1 and a square of the distance D3, a sum of a square of the distance D4 and the square of the distance D3, a sum of the square of the distance D4 and a square of the distance D5, a sum of the square of the distance D2 and a square of the distance D6, and a sum of the square of the distance D5 and the square of the distance D6. Then, in one of the combinations where the sum is the smallest, the association determining unit 13 associates the $blob_t$ at the time t with the $blob_{t-1}$ at the time t−1. In this case, the distance between the $blob_{t,3}$ appearing as noise and a $blob_{t-1, 1}$ or a $blob_{t-1, 2}$ at the time t−1 is likely to be greater than the distance between a $blob_{t, 1}$ or a $blob_{t,2}$ and a $blob_{t-1, 1}$ or a $blob_{t-1, 2}$. Accordingly, the $blob_{t,3}$ appearing as noise is not likely to be associated with the $blob_{t-1, 1}$ or the $blob_{t-1, 2}$ at the time t−1. Thus, it is possible to prevent detection of ghost points.

In this manner, even if a blob of a target which is not originally present is captured due to noise, the electronic white board 300 according to the present embodiment can correctly associate a blob of a present target with a blob captured previously.

If one blob is captured when there is only one target

Further, the electronic white board 300 according to the present embodiment can prevent malfunction due to a blob which results from noise or the like even if only one target is used. For example, although the user stops drawing that involves the use of the indication member, noise or shadow of the hand may be captured as a blob at a next imaging time.

Figure 15:
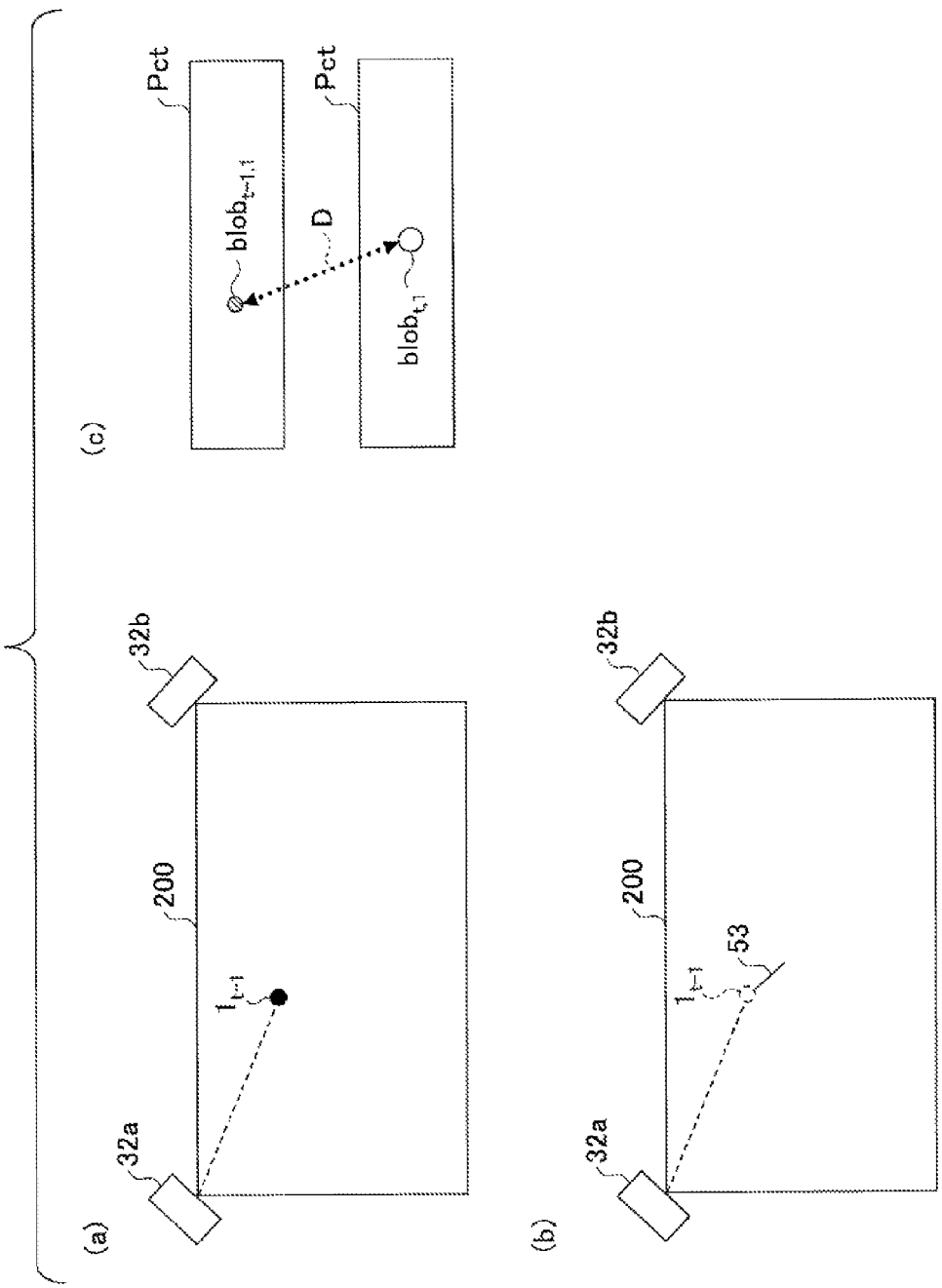
FIG. 15 is a diagram illustrating malfunction of an electronic pen 4 if there is no target.

FIG. 15 is a diagram illustrating malfunction of the electronic pen 4 if there is no target. As shown in FIG. 15-(a), there is one target at the time t−1. Further, as shown in FIG. 15-(b), at the time t, there is no indication member that is used by the user consciously. However, as shown in FIG. 15-(c), a $blob_{t,1}$ may be captured at the time t. In this case, the electronic white board 300 may draw a line 53 connected to the target $1_{t-1}$ at the time t−1 and to a target $1_t$ at the time t based on the assumption that the target is still present at the time t.

When it is assumed that frequency of coordinate calculation by the electronic white board 300 is A Hz and a maximum speed at which a typical user uses the indication member to operate the display surface is B cm/sec, a maximum movement distance Y in intervals of coordinate calculation obtained from the frequency is expressed by B/A. While it is possible to estimate the maximum movement Y if B is experimentally obtained, this is considered to be about 15 to 20 mm.

Accordingly, when the association determining unit 13 compares the maximum movement distance Y as a threshold with the distance D, it is possible to determine that the $blob_{t,1}$ at the time t results from noise, the hand, or the like and prevent malfunction. In other words, even if only one blob is captured at each of the time t and the time t−1, the distance calculation unit 12 calculates the distance D and the association determining unit 13 compares the distance D with the maximum movement distance Y. Unless the distance D is equal to or less than the maximum movement distance Y, coordinates of the $blob_{t,1}$ at the time t are not calculated. In accordance with this, it is possible to prevent malfunction.

If two $blobs_{t-1}$ are captured at the time t−1 but only one $blob_t$ is captured at the time t While the cases where a plurality of $blobs_t$ are captured at the time t are described above, the electronic white board 300 according to the present embodiment can be suitably applied to a case where only one $blob_t$ is captured at the time t.

Figure 16:
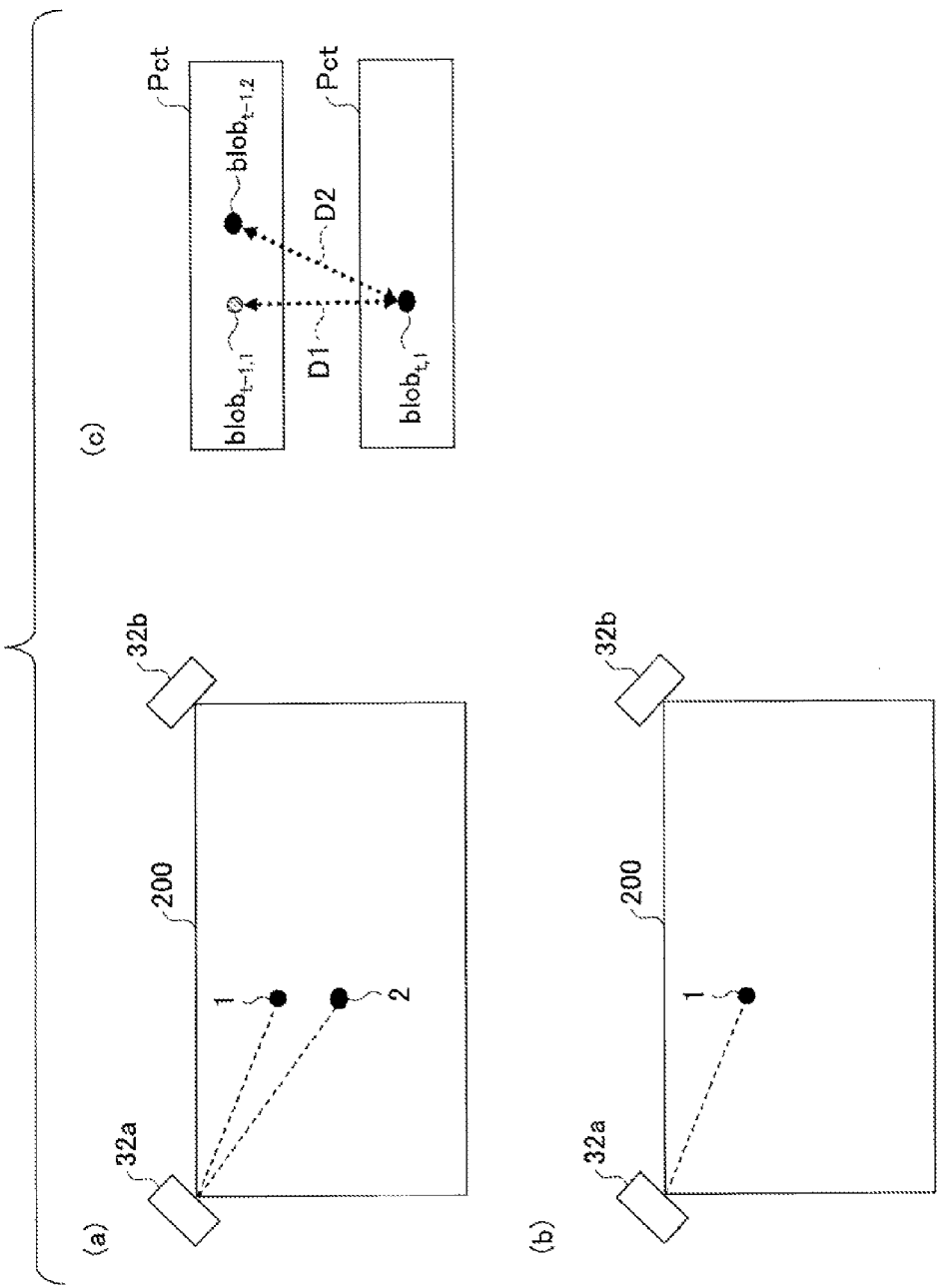
FIG. 16 is a diagram illustrating association if two blobs are captured at a time t−1 but only one blob is captured at a time t.

FIG. 16 is a diagram illustrating association if $blob_{t-1, 1}$ and $blob_{t-1, 2}$ are captured at the time t−1 but only one $blob_{t, 1}$ is captured at the time t. As shown in FIG. 16-(a), the two targets 1 and 2 are captured at the time t−1. As shown in FIG. 16-(b), one target 1 is captured at the time t because one user stops drawing. Accordingly, as shown in FIG. 16-(c), the $blob_{t-1, 1}$ and the $blob_{t-1, 2}$ are captured at the time t−1 and only the $blob_{t, 1}$ is captured at the time t.

In this case, the electronic white board 300 can use the distance D to determine which of the $blob_{t-1, 1}$ and the $blob_{t-1, 2}$ at the time t−1 is associated with the $blob_{t, 1}$ at the time t. In other words, the association determining unit 13 determines whether a square of the distance D1 or a square of the distance D2 is smaller. In the shorter distance, the association determining unit 13 associates the $blob_{t-1, i}$ with the $blob_{t1,1}$.

In accordance with this, even if one user stops drawing, it is possible to continue drawing by tracking a target of another user who does not stop drawing.

<Operational Procedure>

Figure 17:
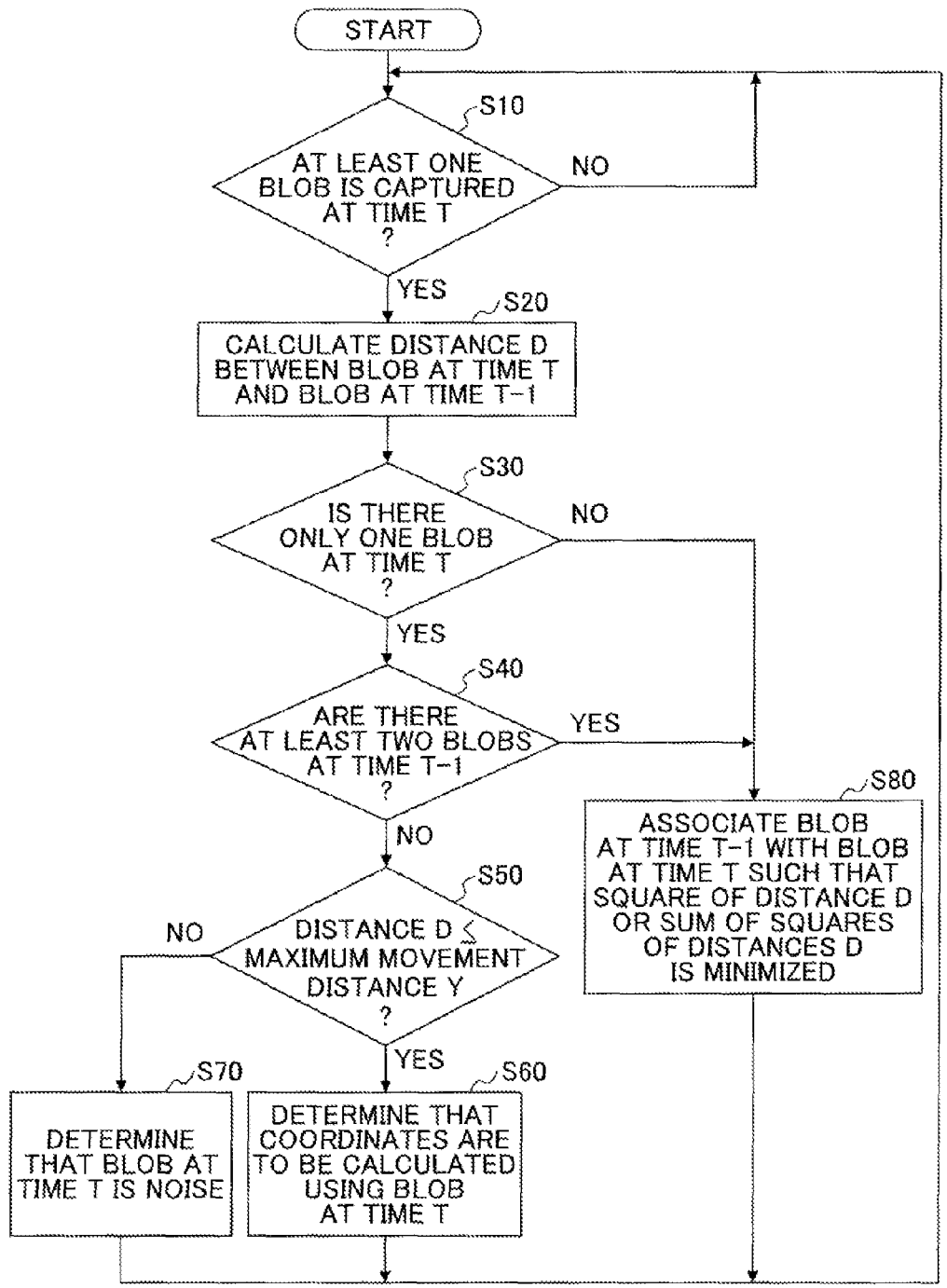
FIG. 17 is a flowchart showing an operational procedure of a computer.

FIG. 17 is a flowchart showing an operational procedure of the computer 100. The operational procedure shown in FIG. 17 starts if the electronic white board 300 is powered on, for example. In addition, the operational procedure shown in FIG. 17 is performed for each image Pct captured by one imaging unit 32.

First, the distance calculation unit 12 determines whether there is at least one blob in an image Pct obtained by the image obtaining unit 11 (S10). If there is no blob in the image Pct (No in S10), it is not necessary to calculate coordinates, so that the distance calculation unit 12 stands by until a blob is captured.

If at least one blob is captured (Yes in S10), the distance calculation unit 12 calculates a distance D between a $blob_t$ at a time t and a $blob_{t-1}$ at a time t−1 (S20).

Next, the association determining unit 13 determines whether there is only one $blob_t$ at the time t (S30). If there is more than one $blob_t$ at the time t (No in S30), the process proceeds to step S80. The association determining unit 13 associates one of $blobs_{t-1}$ at the time t−1 with one of the $blobs_t$ at the time t such that a square of the distance D or a sum of squares of the distances D is minimized (S80). Squares of the distances D are compared only if there is only one $blob_{t-1}$ at the time t−1. The sums of the squares of the distances D are compared only if there are at least two $blobs_{t-1}$ at the time t−1.

If there is only one $blob_t$ at the time t (Yes in S30), the association determining unit 13 determines whether there are at least two $blobs_{t-1}$ at the time t−1 (S40). If there are at least two $blobs_{t-1}$ at the time t−1 (Yes in S40), the process proceeds to step S80.

If there are less than two $blobs_{t-1}$ at the time t−1 (No in S40), in order to determine whether one target is correctly tracked, the association determining unit 13 determines whether the distance D is equal to or less than a maximum movement distance Y (S50).

If a result of the determination in step S50 is Yes, the association determining unit 13 determines that coordinates are to be calculated using the $blob_t$ at the time t (S60).

If the result of the determination in step S50 is No, the association determining unit 13 determines that the $blob_t$ at the time t is noise (S70). In accordance with this, it is possible to prevent malfunction of the electronic white board 300 in such a case where a line is unintentionally drawn in an extended direction when the user finishes writing.

As mentioned above, since the electronic white board 300 according to the present embodiment appropriately associates the $blob_t$ at the time t with the $blob_{t-1}$ at the time t−1, it is possible to track a target at the time t−1 and specify the target at the time t. In accordance with this, the electronic white board 300 can prevent detection of a ghost point. Even if there are increased targets due to noise, the electronic white board 300 can associate blobs captured as targets. Further, even if only one blob is captured, the electronic white board 300 can verify whether blobs at the time t and the time t−1 are correctly associated by using an appropriate threshold.

Other Application Examples

Although preferred embodiments when the present invention is implemented are described based on examples, the present invention is not limited at all to these examples. It is possible to add various types of modifications or replacements to the present invention without departing from the scope of the present invention.

For example, a processing procedure, a specific name, and information including various types of data and parameters described in the embodiments can be arbitrarily changed unless specifically stated. Further, each constituent element of each unit shown in the drawings is conceptual in terms of function. It is not necessary to physically combine constituent elements as shown in the drawings. In other words, a specific form of each unit is not limited to those shown in the drawings, so that the whole part or a part of the unit can be distributed or integrated functionally or physically based on a given unit depending on various types of burden or usage. In other words, the electronic white board 300 described in the embodiments may be constituted by being incorporated into various systems depending on usage or a purpose or may be implemented as a system where each functional unit of the electronic white board 300 is distributed or integrated.

Further, while the electronic white board 300 is used as an example in the present embodiment, the electronic white board 300 may be identified in any way such as an electronic blackboard, an interactive white board, or a smart blackboard.

Further, while the imaging unit 32 is described as capturing an image of light emitted by the electronic pen 4, the indication member may not emit light by itself. For example, a laser illumination device may be disposed around the display 200 and reflected light from reflector tape or the like attached to the indication member may be captured by the imaging unit 32.

Further, the present invention is not limited to these embodiments, and various variations and modifications may be made without departing from the scope of the present invention.

The present application is based on and claims the benefit of priority of Japanese Priority Application No. 2014-248995 filed on Dec. 9, 2014, the entire contents of which are hereby incorporated by reference.

What is claimed is:

1. An optical positional information detection apparatus for detecting a position indicated by a pointer on a display surface where information is displayed, the optical positional information detection apparatus comprising:
   an imaging unit that captures an image of one or more pointers situated within a predetermined distance from the display surface;
   an image obtaining unit that obtains a first image captured by the imaging unit at a first time and a second image captured by the imaging unit at a second time that follows the first time;
   a movement distance calculation unit that uses a first feature amount based on the first image in which one or more first pointers are captured and a second feature amount based on the second image in which one or more second pointers are captured so that the movement distance calculation unit calculates a movement distance from each of the one or more first pointers captured in the first image to each of the one or more second pointers captured in the second image; and
   an association unit that associates each of the one or more second pointers captured in the second image with a corresponding one of the one or more first pointers captured in the first image based on a limitation on the movement distance.

2. The optical positional information detection apparatus as claimed in claim 1, wherein the first feature amount includes a first lateral location of each of the one or more first pointers in the first image and the second feature amount includes a second lateral location of each of the one or more second pointers in the second image, and the movement distance calculation unit uses a difference between the first lateral location and the second lateral location in order to calculate a lateral movement distance from each of the one or more first pointers to each of the one or more second pointers.

3. The optical positional information detection apparatus as claimed in claim 2, wherein
   the movement distance calculation unit uses, as the first feature amount, at least one of a width, an area, and an accumulated brightness value of each of the one or more first pointers, and uses, as the second feature amount, at least one of a width, an area, and an accumulated brightness value of each of the one or more second pointers, and
   the movement distance calculation unit uses an amount of change of the width, the area, or the accumulated brightness value of each of the one or more second pointers relative to the width, the area, or the accumulated brightness value of each of the one or more first pointers in order to calculate a depth movement distance from each of the one or more first pointers to each of the one or more second pointers in a direction of a straight line that connects the imaging unit to each of the one or more second pointers, and the movement distance calculation unit calculates the movement distance from each of the one or more first pointers to each of the one or more second pointers using the lateral movement distance and the depth movement distance.

4. The optical positional information detection apparatus as claimed in claim 3, wherein the movement distance calculation unit gives greater weighting to the lateral movement distance than weighting to the depth movement distance upon calculating the movement distance.

5. The optical positional information detection apparatus as claimed in claim 1, wherein if a plurality of second pointers are captured in the second image and one first pointer is captured in the first image, the association unit calculates the movement distance for each of a plurality of pairs of each of the second pointers and the first pointer, and associates one of the second pointers with the first pointer in one of the pairs where the movement distance is minimized.

6. The optical positional information detection apparatus as claimed in claim 1, wherein if one second pointer is captured in the second image and a plurality of first pointers are captured in the first image, the association unit calculates the movement distance for each of a plurality of pairs of each of the first pointers and the second pointer, and associates one of the first pointers with the second pointer in one of the pairs where the movement distance is minimized.

7. The optical positional information detection apparatus as claimed in claim 1, wherein
   if a plurality of second pointers are captured in the second image and a plurality of first pointers are captured in the first image,
   the movement distance calculation unit calculates the movement distance for each of a plurality of combinations of the first pointers and the second pointers, and
   the association unit calculates a sum of movement distances in each of the combinations and associates the first pointers with the second pointers in one of the combinations where the sum is minimized.

8. The optical positional information detection apparatus as claimed in claim 1, wherein
   if one second pointer is captured in the second image and one first pointer is captured in the first image, the association unit determines whether the movement distance is equal to or less than a threshold, and
   if the movement distance is equal to or less than the threshold, the association unit associates the second pointer captured in the second image with the first pointer captured in the first image.

9. A method for associating pointers, the method being performed by an information processing apparatus for detecting a position indicated by one of the pointers on a display surface where information is displayed, the method for associating pointers comprising:
   capturing an image of one or more pointers situated within a predetermined distance from the display surface;
   obtaining a first image captured in the capturing at a first time and a second image captured in the capturing at a second time that follows the first time;
   using a first feature amount based on the first image in which one or more first pointers are captured and a second feature amount based on the second image in which one or more second pointers are captured in order to calculate a movement distance from each of the one or more first pointers captured in the first image to each of the one or more second pointers captured in the second image; and
   associating each of the one or more second pointers captured in the second image with a corresponding one of the one or more first pointers captured in the first image based on a limitation on the movement distance.

10. The method for associating pointers as claimed in claim 9, wherein the first feature amount includes a first lateral location of each of the one or more first pointers in the first image and the second feature amount includes a second lateral location of each of the one or more second pointers in the second image, and upon calculating the movement distance, a difference between the first lateral location and the second lateral location is used in order to calculate a lateral movement distance from each of the one or more first pointers to each of the one or more second pointers.

11. The method for associating pointers as claimed in claim 10, wherein
   upon calculating the movement distance, at least one of a width, an area, and an accumulated brightness value of each of the one or more first pointers is used as the first feature amount, and, at least one of a width, an area, and an accumulated brightness value of each of the one or more second pointers is used as the second feature amount, and
   upon calculating the movement distance, an amount of change of the width, the area, or the accumulated brightness value of each of the one or more second pointers relative to the width, the area, or the accumulated brightness value of each of the one or more first pointers is used in order to calculate a depth movement distance from each of the one or more first pointers to each of the one or more second pointers in a direction of a straight line that connects a place of the capturing to each of the one or more second pointers, and the movement distance from each of the one or more first pointers to each of the one or more second pointers is calculated using the lateral movement distance and the depth movement distance.

12. The method for associating pointers as claimed in claim 11, wherein upon calculating the movement distance, greater weighting is given to the lateral movement distance than weighting to the depth movement distance.

13. The method for associating pointers as claimed in claim 9, wherein if a plurality of second pointers are captured in the second image and one first pointer is captured in the first image, upon associating, the movement distance is calculated for each of a plurality of pairs of each of the second pointers and the first pointer, and one of the second pointers is associated with the first pointer in one of the pairs where the movement distance is minimized.

14. The method for associating pointers as claimed in claim 9, wherein if one second pointer is captured in the second image and a plurality of first pointers are captured in the first image, upon associating, the movement distance is calculated for each of a plurality of pairs of each of the first pointers and the second pointer, and one of the first pointers is associated with the second pointer in one of the pairs where the movement distance is minimized.

15. The method for associating pointers as claimed in claim 9, wherein
   if a plurality of second pointers are captured in the second image and a plurality of first pointers are captured in the first image,
   upon calculating the movement distance, the movement distance is calculated for each of a plurality of combinations of the first pointers and the second pointers, and
   upon associating, a sum of the movement distances is calculated in each of the combinations, and the first pointers are associated with the second pointers in one of the combinations where the sum is minimized.

16. The method for associating pointers as claimed in claim 9, wherein
   if one second pointer is captured in the second image and one first pointer is captured in the first image, upon associating, whether the movement distance is equal to or less than a threshold is determined, and
   if the movement distance is equal to or less than the threshold, the second pointer captured in the second image is associated with the first pointer captured in the first image.

* * * * *